(12) United States Patent
Ergang et al.

(10) Patent No.: US 10,071,923 B2
(45) Date of Patent: Sep. 11, 2018

(54) ADDITION OF ALUMINUM REAGENTS TO OXOANION-CONTAINING WATER STREAMS

(71) Applicant: Ecolab USA Inc., Saint Paul, MN (US)

(72) Inventors: Nicholas S. Ergang, Glen Ellyn, IL (US); Ronald V. Davis, Geneva, IL (US)

(73) Assignee: Ecolab USA Inc., Saint Paul, MN (US)

( * ) Notice: Subject to any disclaimer, the term of this patent is extended or adjusted under 35 U.S.C. 154(b) by 506 days.

(21) Appl. No.: 14/478,946

(22) Filed: Sep. 5, 2014

(65) Prior Publication Data
US 2016/0068414 A1 Mar. 10, 2016

(51) Int. Cl.
*C02F 1/52* (2006.01)
*C02F 101/10* (2006.01)
*C02F 1/66* (2006.01)
*C02F 101/16* (2006.01)
(Continued)

(52) U.S. Cl.
CPC .......... *C02F 1/5209* (2013.01); *C02F 1/5245* (2013.01); *C02F 1/66* (2013.01); *C02F 2101/10* (2013.01); *C02F 2101/101* (2013.01); *C02F 2101/106* (2013.01); *C02F 2101/108* (2013.01); *C02F 2101/163* (2013.01); *C02F 2101/22* (2013.01); *C02F 2103/10* (2013.01);
(Continued)

(58) Field of Classification Search
None
See application file for complete search history.

(56) References Cited

U.S. PATENT DOCUMENTS 4,059,513 A 11/1977 Zadera
4,906,408 A 3/1990 Bouniol
4,935,146 A 6/1990 O'Neill et al.
(Continued)

FOREIGN PATENT DOCUMENTS

CN 101407356 A 4/2009
DE 3709950 A1 10/1988
(Continued)

OTHER PUBLICATIONS

Bernardo, G. et al., "Role of Ettringite in the Reuse of Hydrated Fly Ash from Fluidized-Bed Combustion as a Sulfur Sorbent: A Hydration Study," Ind. Eng. Chem. Res., 43, 2004, pp. 4054-4059.
(Continued)

*Primary Examiner* — Michael J Felton
*Assistant Examiner* — Katherine Will
(74) *Attorney, Agent, or Firm* — Fredrikson & Byron, P.A.

(57) ABSTRACT

The removal of oxoanions from an aqueous stream having a concentration of a metal cation and a concentration of an oxoanion that varies over time may involve continuously monitoring the concentration of the metal cation and the concentration of the oxoanion to provide a current metal cation concentration and a current oxoanion concentration. A metal cation source and an aluminum reagent may be added to the aqueous stream based on the measured current metal cation concentration and the current oxoanion concentration. The amount of the metal cation source and the aluminum reagent added to the stream may be effective to reduce the concentration of the oxoanion in the aqueous stream below a target threshold.

21 Claims, 11 Drawing Sheets

(51) Int. Cl.
*C02F 101/22* (2006.01)
*C02F 103/10* (2006.01)

(52) U.S. Cl.
CPC ....... *C02F 2209/05* (2013.01); *C02F 2209/11* (2013.01); *C02F 2209/19* (2013.01)

(56) References Cited

U.S. PATENT DOCUMENTS

| | | | |
|---|---|---|---|
| 5,372,717 | A | 12/1994 | Abolt et al. |
| 5,443,730 | A | 8/1995 | Letourneux et al. |
| 5,547,588 | A | 8/1996 | Hassett |
| 5,587,079 | A * | 12/1996 | Rowley ............ C02F 3/28 210/603 |
| 5,695,646 | A | 12/1997 | Graef |
| 6,210,589 | B1 | 4/2001 | Lee et al. |
| 6,280,630 | B1 | 8/2001 | Ramsay |
| 6,280,635 | B1 | 8/2001 | Moriarty et al. |
| 6,312,644 | B1 | 11/2001 | Moriarty et al. |
| 6,358,746 | B1 | 3/2002 | Moriarty et al. |
| 6,369,894 | B1 | 4/2002 | Rasimas et al. |
| 6,645,428 | B1 | 11/2003 | Morris |
| 6,811,704 | B2 | 11/2004 | Cho et al. |
| 7,144,362 | B2 | 12/2006 | Roper, Jr. |
| 7,179,384 | B2 | 2/2007 | Moriarty et al. |
| 7,601,789 | B2 | 10/2009 | Morris et al. |
| 7,772,009 | B2 | 8/2010 | Davis et al. |
| 7,875,720 | B2 | 1/2011 | Morris et al. |
| 7,914,676 | B2 | 3/2011 | Riebensahm |
| 2007/0259441 | A1 | 11/2007 | Saaski |
| 2011/0132839 | A1 | 6/2011 | Zuback et al. |
| 2011/0163032 | A1 | 7/2011 | Alexander et al. |
| 2012/0000859 | A1 | 1/2012 | Mitzlaff et al. |
| 2012/0031850 | A1 | 2/2012 | Smith et al. |
| 2012/0160770 | A1 | 6/2012 | Banerjee et al. |
| 2012/0193296 | A1 | 8/2012 | Bhaduri et al. |
| 2012/0315659 | A1 | 12/2012 | Andreescu et al. |
| 2013/0319951 | A1 * | 12/2013 | Smith ............... C02F 1/5245 210/722 |
| 2014/0251906 | A1 | 9/2014 | Ergang et al. |
| 2015/0083669 | A1 | 3/2015 | Matherly et al. |

FOREIGN PATENT DOCUMENTS

| | | |
|---|---|---|
| DE | 4005469 A1 | 8/1991 |
| EP | 0250626 A1 | 1/1988 |
| EP | 0584502 A2 | 3/1994 |
| EP | 0623559 A1 | 11/1994 |
| GB | 2449996 | 6/2007 |
| JP | S53-047158 A | 4/1978 |
| JP | H10-332 A | 1/1998 |
| JP | 2001-356395 A | 12/2001 |
| JP | 2003-154273 A | 5/2003 |
| JP | 2003-154372 | 5/2003 |
| JP | 2003305477 A | 10/2003 |
| JP | 2011241124 A | 12/2011 |
| RU | 1807015 A1 | 4/1993 |
| RU | 2071451 C1 | 1/1997 |
| RU | 2322398 C1 | 4/2008 |
| SU | 1678773 A1 | 9/1991 |
| WO | 2014/033361 A1 | 3/2014 |

OTHER PUBLICATIONS

Hiraga, Y., "Boron Uptake Behavior During Ettringite Synthesis in the Presence of H3BO3 and in a Suspension of Ettringite in H3BO3," Journal of Chemical Engineering of Japan, vol. 43, No. 10, 2010, pp. 865-871.

Janneck. E. et al., "Ettringite Precipitation vs. Nano-Filtration for Efficient Sulphate Removal from Mine Water," International Mine Water Association Annual Conference, edited by McCullough Lund and Wyse, 2012, pp. 206I-206R.

Zhang, M. et al., "Removal of B, Cr, Mo, and Se from Wastewater by Incorporation into Hydrocalumite and Ettringite," Eviron. Sci. Technol., 37, 2003, pp. 2947-2952.

McAuley et al., "Quantitative detection of aqueous arsenic and other oxoanions using attenuated total reflectance infrared spectroscopy utilizing iron oxide coated internal reflection elements to enhance the limits of detection," Analytica Chimica Acta, vol. 581, 2007, pp. 309-317.

Hubbe, "Polyaluminum Chloride (PAC)," Mini-Encyclopedia of Papermaking Wet-End Chemistry, NC State University, Feb. 1, 2001.

Butseva et al., "Removal of Sulfates From Wastewater by Liming and Coagulation and Using Aluminum Oxychloride," Abstract, Vodosnabzhenie i sanitarnai•a• tekhnika, 2009, pp. 49-51.

Cheng et al., "Study on Removal of Sulfuric Acid Radical From Mining Water," Abstract, Wujiyan Gongye, vol. 41, Issue 7, 2009, pp. 51-53.

Lin, "Treatment of Sulfate Wastewaters," Abstract, Tumu Shuili, vol. 9, Issue 3, 1982, pp. 25-31.

Rubio et al., "Clean Technologies for the Treatment of Coal Acid Mining Effluents," Fifth International Conference on Clean Coal Technologies, Zaragoza, Spain, 2011, pp. 1-11.

Smit et al., "Pilot Plant Study to Treat Typical Gold Mine Minewater Using the Savmin Process," Water in Mining, vol. 6, 2003, pp. 355-362.

International Search Report and Written Opinion dated Jun. 8, 2015 for related International Application PCT/US2014/054396, 23 pages.

International Search Report dated May 26, 2014 for related International Application PCT/US2014/014948, 3 pages.

International Search Report and Written Opinion dated Jun. 8, 2015 for related International Application PCT/US2014/054390, 14 pages.

Summary and Abstract of Chilean Application No. 200800232, filed Jan. 28, 2008, Siemens Aktiengesllschaft, Retrieved from Chilean Patent Office website <http://ion.inapi.cl:8080/Patente/ConsultaAvanzadaPatentes.aspx>.

Chrysochoou et al., "Evaluation of ettringite and hydrocalumite formation for heavy metal immobilization: Literature review and experimental study," Journal of Hazardous Materials, vol. 136, No. 1, Aug. 10, 2006, pp. 20-33.

European Patent Application No. 14901341.9, Extended European Search Report dated Jan. 22, 2018, 10 pages.

Jones et al., "Mineral species control of aluminum solubility in sulfate-rich acidic waters," Geochimica Et Cosmochimica Acta, vol. 75, No. 4, Dec. 1, 2010, pp. 965-977.

European Patent Application No. 14901428.4, Extended European Search Report dated Apr. 12, 2018, 6 pages.

Silva et al., "Sulphate ions removal from an aqueous solution: I. Co-precipitation with hydrolysed aluminum-bearing salts," Minerals Engineering, vol. 23, 2010, pp. 1220-1226.

* cited by examiner

ADDITION OF ALUMINUM REAGENTS TO OXOANION-CONTAINING WATER STREAMS

This application may be found related to U.S. patent application Ser. No. 13/787,365, filed Mar. 6, 2013, and a co-filed application entitled "OXOANION CONCENTRATION DETERMINATION USING ALUMINUM REAGENTS". The entire contents of both these applications are incorporated herein by reference.

TECHNICAL FIELD

This disclosure relates to the treatment of aqueous streams containing oxoanions and, more particularly, to the monitoring of oxoanion-containing streams and the treatment of oxoanion-containing streams with aluminum reagents.

BACKGROUND

Oxoanions are a class of oxygen-bearing anionic molecules that can be formed during industrial processes. For example, typical oxoanions encountered during commercial processing operations include borate, carbonate, phosphate, sulfate, chromate, and arsenate. These oxoanions can be formed when a substance containing the non-oxygen element of the oxoanion is exposed to oxygen, water, and/or bacteria. Because of the adverse health and environmental effects associated with many oxoanions, governmental regulatory agencies often limit the level at which certain oxoanions can be discharged with waste water into the environment.

One situation where oxoanions can be formed is during the excavation of earthen material. Excavations such as mining operations, milling operations, road constructions, etc., can expose earthen material to oxygen and water, generating an aqueous effluent containing the oxoanions. These effluents can include, for example, acid mine rock drainage (referred to as ARD or AMD), mill tailings, excess decant water, seepages, and acidic process waste streams. Acid mine rock drainage forms when minerals in rocks are exposed to oxidizing conditions in mining operations, highway construction, and other large scale excavations.

Oxoanions can be difficult to separate from water because they often form relatively weak anions. Further complicating separation efforts is the recognition that oxoanion compositions and concentrations can change over time and with environmental factors. Factors such as rainfall, temperature, industrial process conditions, earthen matter content, and process chemical components can cause changes in the makeup of oxoanions in a given waste water stream over time. Ensuring that aqueous streams having variable oxoanion compositions and concentrations are properly treated can help ensure compliance with governmental regulatory requirements and good environmental and health stewardship.

SUMMARY

In general, this disclosure is directed to systems, compositions, and techniques for reducing the concentration of oxoanions in industrial aqueous solutions, such as waste water streams being treated before being discharged to the surrounding environment. In some applications, an aqueous stream having one or more oxoanions and conjugate metal cations is continuously monitored to measure the current concentration of the one or more oxoanions in the stream and the current concentration of the metal cation(s) in the stream. Chemical precipitating agents are then added to the waste water stream based on the current concentration of the oxoanion, the current concentration of the metal cation, and a target discharge threshold for the oxoanion. The target discharge threshold may be a maximum concentration limit above which the waste water stream cannot be discharged without violating an oxoanion concentration limit. The target discharge threshold may also be a concentration limit above which the oxoanion content is too high to suitably reuse the water stream within a downstream process. The chemical precipitating agents may include a metal cation source (e.g., in instances in which there is not a high enough metal cation concentration already in the stream) and an aluminum source that bind with the oxoanion to form a metal cation alumino-oxoanion hydroxide hydrate precipitate.

Over time, the composition of the waste water stream may change such that new incoming waste water forming the stream has a different oxoanion content and/or different metal cation content than previously received waste water forming the stream. It has been recognized that this variation can have meaningful consequences in practice. For example, in instances where the metal cation concentration and/or the oxoanion concentration of the waste water stream changes, the dosing rates of the chemical precipitating agents may need to change to prevent the oxoanion concentration in the treated stream from exceeding a discharge limit.

If the oxoanion concentration of the incoming stream increases and/or the metal cation concentration of the stream decreases, the dosing rates of the metal cation source and/or aluminum reagent may be too low. This can limit the formation of the metal cation alumino-oxoanion hydroxide hydrate precipitate, causing the oxoanion concentration in the treated stream to exceed a desired limit. By contrast, if the oxoanion concentration of the incoming stream decreases and/or the metal cation concentration of the stream increases, the dosing rates of the metal cation source and/or aluminum reagent may be too high. Not only is this economically inefficient because of the excess dosing of precipitating agents, but it has been observed that, in some examples, excess addition of precipitating agent leads to a reduction in the overall amount of oxoanion formed. For example, the addition of increasing amounts of metal cation source and/or aluminum reagent may increase the amount of precipitate formed—and correspondingly the amount of oxoanion consumed—until a concentration inflection point is reached for the metal cation source and/or aluminum reagent. Increasing the concentration of the metal cation source and/or aluminum reagent in the waste water stream being treated beyond the inflection point can reduce the amount of precipitate formed, increasing the amount of oxoanion remaining in the treated waste water stream.

By continuously measuring the current concentration of the oxoanion in the stream being treated and the current concentration of the metal cation in the stream (e.g., the metal cation that binds with aluminum to form a metal cation alumino-oxoanion hydroxide hydrate precipitate), the oxoanion concentration in the stream can be accurately and reliably reduced below a target threshold. This can help ensure economically efficient compliance with any regulatory limits that may exist on the oxoanion concentration in a stream before it can be discharged to the environment.

In one example, a method for reducing a concentration of one or more oxoanions in an aqueous stream is described. The method includes receiving an aqueous stream having a metal cation and an oxoanion, where a concentration of the metal cation varies over time and a concentration of the oxoanion varies over time. The method also includes continuously measuring the concentration of the metal cation so as to provide a current metal cation concentration in the aqueous stream, continuously measuring the concentration of the oxoanion in the aqueous stream so as to provide a current oxoanion concentration in the aqueous stream, and adding a metal cation source to the aqueous stream and an aluminum reagent to the aqueous stream. The method specifies that an amount of the metal cation source added to the aqueous stream is determined based on the current metal cation concentration in the aqueous stream, an amount of the aluminum reagent added to the aqueous stream is based on the current oxoanion concentration in the aqueous stream, and the amount of the metal cation source and the amount of the aluminum reagent added to the aqueous stream is effective to reduce the concentration of the oxoanion in the aqueous stream below a target threshold.

In another example, a system is described that includes a source of an agent containing metal cations, a source of an aluminum reagent, one or more sensors, and a controller. The example specifies that the one or more sensors are configured to analyze an aqueous solution having a metal cation of variable concentration and an oxoanion of variable concentration and the one or more sensors are configured to measure the variable concentration of the metal cation so as to provide a current metal cation concentration in the aqueous solution and measure the variable concentration of the oxoanion so as to provide a current oxoanion concentration in the aqueous solution. The example also specifies that the controller is configured to control addition of the agent containing metal cations and the aluminum reagent to the aqueous solution based on the current metal cation concentration and the current oxoanion concentration measured by the one or more sensors.

In another example, a method is described that includes adding a basic alkaline earth metal reagent to an aqueous solution containing an oxoanion, thereby precipitating a first portion of the oxoanion out of the aqueous solution and generating an aqueous solution have a reduced concentration of the oxoanion. The method includes determining a concentration of the oxoanion in the aqueous solution having the reduced concentration of the oxoanion and adding an aluminum reagent to the aqueous solution having the reduced concentration of the oxoanion based on the determined concentration of the oxoanion, thereby precipitating a second portion of the oxoanion out of the aqueous solution having the reduced concentration of the oxoanion.

The details of one or more examples are set forth in the accompanying drawings and the description below. Other features, objects, and advantages will be apparent from the description and drawings, and from the claims.

DETAILED DESCRIPTION

Figure 1:
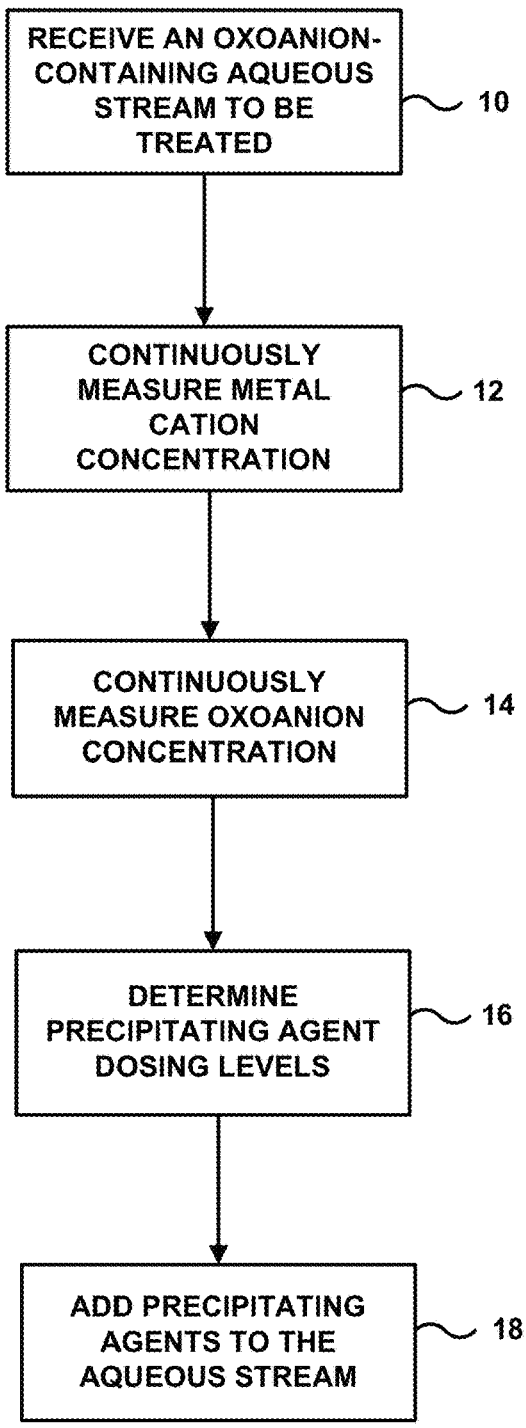
FIG. 1 is a flow diagram illustrating an example process for reducing a concentration of one or more oxoanions in an aqueous stream.

This disclosure generally relates to systems and techniques for treating waste water streams containing oxoanions to reduce the oxoanion concentration level in the waste water streams below a target concentration level. The target concentration level may be a level below which a waste water stream can be discharged to the surrounding environment (e.g., a river, lake, public sewer system) while complying with any environmental or health mandates. For example, the target concentration level may be a maximum allowable oxoanion concentration level set by a company's environmental, health, and safety standards or by local or national laws or regulations. The target discharge threshold may also be a concentration limit below which the oxoanion concentration is required to fall in order make the water stream suitable for use in a downstream industrial process.

To reduce the oxoanion concentration level in the waste water stream below a target concentration level, at least one precipitating agent and, in some examples multiple precipitating agents, may be added to the waste water stream. For example, a metal cation source such as a basic alkaline earth metal reagent may be added to the waste water stream and/or an aluminum reagent. The metal cation source and the aluminum reagent can bind with oxoanions present within the waste water stream to form a precipitate. This precipitate can be removed from the waste water stream, thereby reducing the concentration of oxoanions in the stream.

In practice, it has been recognized that oxoanion concentrations in industrial waste water streams can vary significantly over time. For example, in an excavation operation generating acid mine drainage effluent, variations in the chemical makeup of the earthen matter being excavated and changes in rainfall and temperature, among other factors, can cause variability in the oxoanion content of the effluent. Depending on the characteristics of the specific excavation operation, the oxoanion concentration in the effluent may vary by greater than 10% during the course of a day. In instances where one or more precipitating agents are being added to this effluent to reduce the oxoanion content of the stream, the large variation in oxoanion concentration can undermine the efficacy of the precipitating agents being added to the stream.

In some applications in accordance with the disclosure, a waste water stream having a variable oxoanion concentration is continuously monitored to determine the current oxoanion concentration in the stream. The concentration of the metal cation(s) corresponding to the oxoanions may also be continuously monitored to determine the current metal cation concentration in the stream. For example, the concentration of metal cation(s) that bind with aluminum and oxoanions to form a metal cation alumino-oxoanion hydroxide hydrate precipitate may be continuously monitored. With knowledge of the current oxoanion concentration and the current metal cation concentration in the stream, the dosage rate of the precipitating agents being added to the stream may be adjusted to an amount effective to reduce the oxoanion concentration in the stream below a target threshold. For example, the dosage rates of the precipitating agents may be adjusted to an amount effective to reduce the oxoanion concentration in the stream below a concentration threshold, allowing the stream to be discharged to the environment, without substantially overdosing and precipitating excess oxoanions that can be discharged to the environment with the waste water without violating discharge standards.

While not wishing to be bound by any particular theory, it has been discovered that, in some applications, oxoanion precipitation and removal is highly sensitive to the oxoanion concentration in the stream being treated and the concentration of precipitating agents added to the stream. In some cases, even small changes in the parts-per-million level of the oxoanion concentration and/or precipitating agent concentration can yield large changes in the oxoanion concentration of the treated stream. For example, complex interactions between the oxoanions in the stream being treated and the precipitating agents can produce precipitation limits. Increasing the concentration of the precipitating agents added to the stream up to these limits can increase the amount of oxoanion precipitated from the stream. Further increasing the concentration of the precipitating agents beyond the precipitation limits can cause at least some of the precipitated oxoanion to re-dissolve, reducing the amount of oxoanion precipitated from the stream being treated. That is, the system may exhibit a precipitation inflection point (e.g., maxima) whereby reducing or increasing the concentration of the precipitating agents added to the stream causes a reduction in the amount oxoanion precipitated from the stream.

In applications where the waste water stream being treated exhibits an oxoanion precipitation inflection point that shifts based on the concentration of the oxoanions and/or the concentration of the metal cations in the stream, continuous monitoring of the oxoanion and/or metal cation concentrations in the stream can facilitate accurate dosing of precipitating agents. For example, the quantity of a metal cation source being added to the stream and/or the quantity of an aluminum reagent being added to the stream may be adjusted based on the concentration of the metal cation and/or oxoanion in the incoming stream to be treated. The precipitating agents may also be adjusted based on the precipitation inflection point corresponding to the oxoanion concentration of the incoming stream and/or the target oxoanion concentration level for the stream after treatment.

FIG. 1 is a flow diagram illustrating an example process for reducing a concentration of one or more oxoanions in an aqueous solution, such as a reservoir or flowing stream of water containing oxoanions to be treated. The process includes receiving an oxoanion-containing stream to be treated (10), continuously measuring the concentration of metal cations in the stream (12) to determine a current metal cation concentration, and continuously measuring the oxoanion concentration in the stream (14) to determine a current oxoanion concentration. In addition, the example technique of FIG. 1 includes determining precipitating agent dosing levels (16) based on the current metal cation concentration and the current oxoanion concentration and then adding the precipitating agents to the stream (18) at the determined dosing levels. As described in greater detail below, a variety of different chemical compounds, hardware configurations, and operating conditions can be used to reduce the oxoanion concentration in a stream being treated according to the example technique of FIG. 1.

In the technique of FIG. 1, an aqueous stream containing one or more oxoanions can be received from an industrial process (10) and treated to reduce the concentration of the one or more oxoanions and produce a treated aqueous stream. The aqueous stream can be received from a variety of different industrial processes, and the disclosure is not limited to treating an aqueous stream from any particular source. In some applications, the aqueous stream is a discharge stream, effluent, run-off, and/or seepage from a mine, coal refuse pile, construction site, chemical plant, or other location. For example, the aqueous stream may be a discharge stream forming a mine drainage where rock formations have been disturbed (e.g., excavated) and exposed to water sources such as rainfall, surface water, and/or subsurface water sources, such that the water contains metals and minerals in solution or suspension. The mine rock drain can be acid (sometimes referred to as acid mine rock drainage) or alkaline (sometimes referred to as alkaline mine rock drainage) depending on the source. In either case, the stream can be produced from mine sites, including active, inactive, or abandoned extraction and/or excavation operations for removing minerals, metals, ores and/or coal from the earth. Examples of such extraction operations include oil sands, coal, minerals, metals and ores including limestone, talc, gold, silver, iron, zinc, manganese, molybdenum, antimony, chromium, and nickel. Other example sources of an aqueous stream containing one or more oxoanions include flue gas desulfurization water, pulp and paper waste water, and aluminum processing water.

Independent of the source of the aqueous stream, the stream may contain oxoanions needing to be treated and removed before the stream can be discharged. The term oxoanion, which may also be called an oxyanion, refers to a negatively charged chemical compound having the formula $A_xO_y^{z-}$, where A is a chemical element other than oxygen; O is oxygen; Z is typically an integer having a value of at least one (e.g., 1, 2, 3, or more); X is typically an integer having a value of 1 or 2; and Y is typically an integer having a value of at least 1 (e.g., 1, 2, 3, 4 or more).

Oxoanions can be formed by many chemical elements. For example, oxoanions include borate, carbonate, nitrate, phosphate, sulfate, chromate, arsenate, selenate, molybdate, nitrite, phosphate, sulfite, arsenite, selenite, hypophosphite, phosphate, hyposulfite, perchlorate, perbromate, periodate, permanganate, chlorate, chromate, bromate, iodate, chlorite, bromite, hypochlorite, and hypobromite. A specific oxoanion can be formed at an extraction site by exposing a chemical element to oxygen and water. For example, the oxoanion sulfate can be formed when extracted earthen material containing metal sulfide is exposed to oxygen and water.

The specific oxoanions present in the aqueous stream undergoing treatment will vary, e.g., based on the type of process producing the stream and the source of the oxoanions. In some examples, the aqueous stream undergoing treatment includes (or, in other examples, consists or consists essentially of) sulfate, molybdate, borate, selenite, selenite, arsenate, nitrate, and/or vandinate. For example, the aqueous stream may have one or more oxoanions having the formula $A_xO_y^{z-}$, where A is selected from the group consisting of Mo, B, Cr, Se, As, N, S, and V; X is an integer having a value of 1 or 2; Y is an integer having a value of at least 1; and Z is an integer having a value of at least 1. In one specific example, the aqueous stream includes (or, in other examples, consists essentially of) sulfate ($SO_4^{2-}$). Sulfate is an oxoanion found in many acid mine rock drainage waste streams and other excavation effluents. In some examples, the aqueous stream includes a mixture of multiple oxoanions.

In addition to containing one or more oxoanions, the aqueous stream undergoing treatment may contain corresponding cations, e.g., providing electrical charge neutrality to the stream. The types of cations present in the aqueous stream will again vary based on the process producing the stream and the source of the cations. Typical cations associated with oxoanion-containing waste effluent streams include metal cations, such as Group I alkali metals (e.g., Na, K) and/or Group II alkaline earth metals (e.g., Be, Mg, Ca). In the case of acid mine rock drainage streams, heavy metals such as iron, chromium, cobalt, zinc, nickel, and/or copper may also be present.

The concentration of the metal cations and oxoanions in the aqueous stream before treatment with precipitating agents can range, e.g., from less than 500 parts per million (ppm) to greater than 1000 ppm. For example, the metal cations and/or oxoanions in the incoming stream may each be greater than 500 ppm, such as greater than 750 ppm, greater than 1000, greater than 1500 ppm, or even greater than 2500 ppm (e.g., 10,000 ppm to 20,000 ppm). In some applications, the concentration of the metal cations and/or the oxoanions in the incoming stream may range from 100 ppm to 3000 ppm, such as from 500 ppm to 2500 ppm, from 1000 ppm to 2000 ppm, or from 1100 ppm to 1500 ppm. The foregoing concentrations may be for a specific metal cation and oxoanion pair or may be the sum of all metal cations and oxoanions within the stream. Further, unless otherwise noted, parts per million (ppm) as used herein referred to parts per million by weight.

As one example, the aqueous stream may contain sulfate at a concentration level ranging from 1000 ppm to 2000 ppm. For example, the aqueous stream may contain sulfate ranging from 900 ppm to 1500 ppm, providing a current sulfate oxoanion concentration ranging from 900 ppm to 1500 ppm. The corresponding metal cation may be present in the aqueous stream at a lesser weight concentration than the oxoanion, e.g., due to the relative weight differences between the cation and sulfate oxoanion. For example, in instances in which sulfate is present as calcium sulfate, the calcium may range 265 ppm to 450 ppm, providing a current cation concentration ranging from 265 ppm to 450 ppm. This calcium concentration may be lower in cases where other transitional metal cations are present within the aqueous stream in lieu of calcium.

In practice, the concentration of the metal cations and oxoanions can vary over time. Factors such as rainfall, temperature, industrial process conditions, and earthen matter content, among others, can cause the metal cations and/or oxoanions to become diluted or increase in concentration in a flowing stream relative to the concentration at an earlier period of time. The concentration change of the metal cation and/or oxoanion over a period of time may be greater than 10 percent, such as greater than 25 percent, or greater than 50 percent. For example, in the case of an aqueous stream containing approximately 1200 ppm sulfate and varying by approximately 25 percent over a period of time, the sulfate can vary within a range from approximately 900 ppm to 1500 ppm. The period of time over which the concentration varies may be comparatively short, such as a half hour or hour, or longer, such as a shift (e.g., an eight hour shift), a day, or a week. As discussed in greater detail below, these concentration variations can have an impact on desired precipitation agent dosing levels for maximizing oxoanion precipitation and removal.

In addition to one or more oxoanions and corresponding metal cations, the remainder of the stream may comprise water and specific compounds corresponding to the source of the aqueous stream. Example compounds that may be present in the aqueous stream include, but are not limited to, transitional metal cations, carbonated bicarbonate, cyanide, organics, flocculants, and/or floatation aids.

Regardless of the composition of the aqueous stream being treated to reduce oxoanion content, the stream can be received from a source and subject to analysis and oxoanion precipitation. The aqueous stream can be received and collected within one or more treatment vessels, providing a static volume of liquid that can be analyzed and treated before being discharged. Alternatively, the aqueous stream can be analyzed online (e.g., by drawing a slip stream) and treated to reduce oxoanion content while flowing. Depending on the source, the aqueous stream containing oxoanions to be treated can be a continuous flow of liquid. The flow of liquid may be substantially or entirely uninterrupted over a period of time, such as a period of greater than 30 minutes, a period of greater than 24 hours, or a period of greater than 1 week.

In the example technique of FIG. 1, the aqueous stream to be treated is received (10) and continuously measured to determine a current metal cation concentration in the stream (12) and also a current oxoanion concentration in the stream (14). Continuous measurement of the metal cation concentration in the stream and of the oxoanion concentration in the stream can be useful to detect changes in the concentration(s) and provide precipitating agent dosing control. The current metal cation concentration may be the metal cation concentration most recently measured in the aqueous stream. Similarly, the current oxoanion concentration may be the oxoanion concentration most recently measured in the aqueous stream. Each new measurement of the metal cation concentration and the oxoanion concentration in the aqueous stream can establish a new current metal cation concentration and a new current oxoanion concentration, replacing the former measurement values. In other examples, the technique of FIG. 1 does not involve continuously measuring both the current metal cation concentration (12) and the current oxoanion concentration (14) in the aqueous stream but only one of the two values.

In practice, the frequency with which the metal cation concentration and/or the oxoanion concentration is continuously measured may be dictated by the observed variability of the metal cation and/or the oxoanion concentration in the stream. If the concentration(s) vary substantially (e.g., +/−5%) over a short period of time, more frequent measurements may be appropriate. By contrast, if the concentration(s) only vary substantially over a longer period of time (e.g., seasonally with precipitation and temperature changes), less frequent measurements may be appropriated.

In different examples, the metal cation and/or the oxoanion concentration may be continuously measured by measuring the metal cation concentration and/or the oxoanion concentration at least once per day, such at least one every 8 hours, at least once every 4 hours, at least one per hour, at least once per half hour, or at least once per minute. The frequency with which the metal cation concentration is measured may be the same as or different than the frequency with which the oxoanion concentration. Further, the metal cation and/or the oxoanion concentration can be measured by extracting a slip stream from the flowing aqueous stream and analyzing the concentration(s) online. Alternatively, a non-flowing sample can be extracted from the aqueous stream source and analyzed to determine the concentration(s), e.g., automatically or using manual laboratory techniques.

A variety of different techniques can be used to continuously measure the concentration of the one or more metal cations in the aqueous stream undergoing oxoanion reduction. As one example, the concentration of the metal cation in the aqueous stream can be measured spectrophotometrically. In this technique, a spectroscopic reagent binding with the metal cation can be added to a sample of the aqueous stream. Light (e.g., within the visible, near-ultraviolet, and/or near-infrared spectrum) can then be directed into the aqueous liquid undergoing analysis and a photometer used to measure the intensity of the reflection or transmission of the light. The spectrophotometric properties of the liquid can vary based on the concentration of the metal cation bound with spectroscopic reagent, allowing the metal cation concentration to be measured.

As another example, the concentration of the metal cation in the aqueous stream can be measured spectrofluorometrically. During spectrofluorometry, light at a certain wavelength or range of wavelengths can be emitted into the aqueous liquid undergoing analysis, causing molecules in the liquid to excite and emit fluorescent emissions at a different wavelength or wavelengths. The fluorescent emissions can be detected and correlated to the concentration of the metal cation in the aqueous liquid. In some examples in accordance with this technique, a fluorophore is added to the aqueous liquid that binds with the metal cation forming a fluorophore-metal cation complex. This fluorophore-metal cation complex can emit fluorescent emissions in response to excitation energy, allowing the metal cation to be detected and quantified.

As yet another example, the concentration of the metal cation in the aqueous stream can be measured via electrical conductivity. For example, an ion-selective electrode can be used to measure the electrical potential of a specific metal cation in the aqueous liquid under analysis. The ion-selective electrode may include an ion-specific membrane and a transducer or sensor that converts the activity of a metal cation in the aqueous liquid to the electrical potential, which can be measured by a voltmeter or pH meter. The electrical potential can be correlated to the concentration of the metal cation in the aqueous liquid, allowing the current metal cation concentration to be determined.

When continuously measuring the current metal cation concentration in the aqueous liquid (14) according to the technique of FIG. 1, the concentration of all metal cations can be measured continuously or only the concentration of one or more specific metal cations can be measured continuously. In general, it is useful to measure the concentration of metal cation(s) that bind during an equilibrium precipitation reaction in which the oxoanion is precipitated out of the aqueous stream undergoing treatment. This is because the concentration of the metal cation(s) can influence the precipitation efficiency of the oxoanion removal process. Accordingly, in some examples, the technique of FIG. 1 involves continuously measuring the current metal cation concentration of those metal cation(s) binding with the oxoanion(s) upon the addition of precipitating reagents to form a removable oxoanion precipitate. The concentration of other metal cations that do not bind with the oxoanion precipitate may or may not also be measured.

A variety of different techniques can also be used to continuously measure the concentration of the one or more oxoanions in the aqueous stream undergoing oxoanion reduction (14). An example technique that can be advantageously used to continuously measure oxoanion concentrations is described in a co-filed patent application entitled "OXOANION CONCENTRATION DETERMINATION USING ALUMINUM REAGENTS", the entire contents of which are incorporated herein by reference.

As one example of a technique that can be used to measure oxoanion concentrations, a barium precipitating agent can be added to the aqueous liquid undergoing analysis to form a barium oxoanion precipitate. The barium oxoanion precipitate can be measured optically, for example, by measuring the turbidity or spectrophotometric response of the liquid containing the barium oxoanion precipitate. The optical response can be correlated to the concentration of the oxoanion present in the liquid undergoing analysis, allowing the current oxoanion concentration to be determined. With this approach, the total concentration of all oxoanions precipitated by the barium precipitating agent may be measured together and established as the current oxoanion concentration rather than measuring the concentration of a specific oxoanion species (e.g., chromate, sulfate).

As another example, the concentration of the oxoanion in the aqueous stream can be measured used Raman spectroscopy. In Raman spectroscopy, light typically supplied by a laser is directed into the liquid sample containing the oxoanions. The light interacts with molecular vibrations, phonons or other excitations in the liquid, resulting in the energy of the light photons being shifted up or down. The shift in energy gives information about the vibrational modes in the liquid system which, in turn, can be correlated to the concentration of the oxoanions in the liquid. In this manner, Raman spectroscopy can provide current oxoanion concentration information.

As an additional example, the concentration of the oxoanion can be measured via electrical conductivity. In one application in accordance with this example, the electrical conductivity of the liquid containing the oxoanion is measured directly, e.g., by measuring the electrical resistance of the liquid. The electrical conductivity of the liquid can be correlated to the current concentration of the oxoanion in the liquid. In another application in accordance with this example, an ion-selective electrode can be used to measure the electrical potential of a specific oxoanion in the aqueous liquid under analysis. The ion-selective electrode can convert the activity of the oxoanion in the aqueous liquid to an electrical potential, which can be measured by a voltmeter or pH meter. The electrical potential can be correlated to the concentration of the oxoanion in the aqueous liquid, allowing the current oxoanion concentration (e.g., of a specific oxoanion species) to be determined.

As yet a further example, the oxoanion in the liquid under analysis can be measured optically by complexing the oxoanion with a fluorophore and aluminum. Example fluorophores that may be used included, but are not limited to, 1,3,6,8-pyrenetetrasulfonic acid, 1-pyrenesulfonic acid, 8-hydroxy-1,3,6-pyrenetrisulfonic acid, y-oxo-1-pyrenebutyric acid, 1-pyrenecarboxylic acid, 1,5-naphthalenedisulfonic acid, and/or 1-naphthalene sulfonic acid. The fluorophore-aluminum-oxoanion complex can be spectrofluorometry analyzed by directing light at a certain wavelength or range of wavelengths into the aqueous liquid undergoing analysis and causing the free fluorophore (uncomplexed fluorophore) remaining in the sample to excite and emit fluorescent emissions at a different wavelength or wavelengths. The fluorescent emissions can be detected and correlated to the concentration of the oxoanion in the aqueous liquid.

When continuously measuring the current oxoanion concentration in the aqueous liquid (14) according to the technique of FIG. 1, the concentration of all oxoanions can be measured continuously or only the concentration of one or more specific oxoanions (e.g., sulfate) can be measured continuously. The specific technique used to measure the oxoanion(s) in the aqueous liquid may dictate whether specific oxoanion species can be resolved from other oxoanion species in the liquid. Further, it should be appreciated that while the techniques for continuously measuring the metal cation concentration (12) and continuously measuring the oxoanion concentration (14) have been described as separate, in some examples, a single analytical technique may simultaneously measure both the current metal cation concentration and the current oxoanion concentration of the stream.

With further reference to FIG. 1, the example technique includes determining a precipitating agent dosing level (16) based on the current metal cation concentration and the current oxoanion concentration and then adding the precipitating agent to the aqueous stream (18) at the determined dosing level. Suitable precipitating agents can be selected based on their ability to react with one or more oxoanions desired to be removed from the aqueous stream being processed. For example, suitable precipitating agents can include those that complex with solubilized oxoanions to form a solid oxoanion precipitate that can be removed from the aqueous stream undergoing treatment.

In some examples, precipitating agents used to reduce the oxoanion concentration in the aqueous stream undergoing treatment include a metal cation source and an aluminum reagent. Metal cations from the metal cation source and aluminum from the aluminum reagent can complex with a solubilized oxoanion species to form a metal cation-oxoanion-aluminum species that precipitates out of the aqueous liquid. The metal cation-oxoanion-aluminum species may or may not exhibit ettringite-type stoichiometry.

Ettringites are generally considered a class of ionic compounds that encompass hydrous calcium aluminum sulfate minerals having the formula $Ca_6Al_2(SO_4)_3(OH)_{12} \cdot 26H_2O$ and a series of chemically analogous isostructural compounds. For instance, all or part of the calcium may be substituted with one or more divalent metal cations (e.g., alkaline earth metals such as $Mg^{2+}$); all or part of the hydroxide may be substituted with one or more monovalent anions ions, such as chloride, fluoride, iodide, and bromide; and all or part of the sulfate can be substituted with one or more other oxyanions, such as chromate, selenate, selenite, arsenate, nitrate, vandinate, borate, and carbonate. As an example, a molybdenum containing ettringite can have a molybdate oxyanion in place of one or more sulfate anions. Also, the amount of water of hydration may vary.

Ettringites can be defined more specifically as compounds with the formula $C_6M_2(OH)_x(A)_y(D)_z \cdot E(H_2O)$, where C is one or more metal cations (e.g., divalent metal cations), M is one or more trivalent metals, A is one or more oxyanions with one or more charges n−, D is one or more monovalent anions with charge 1−, E is 26 or 32, n is 1, 2, 3, or 4, and x, y, and z are defined such that $x+(y \cdot n)+z=18$, $x>0$, $y>0$, and $z \geq 0$. When an ettringite contains more than one oxyanion A with different charges n−, then (y)(n) is the sum of the value y for each oxyanion A multiplied by the n values for each respective oxyanion. For example, if A is $(VO_4)(ClO_3)_3$, wherein $VO_4$ has a charge of 3− (n=3) and $ClO_3$ has a charge of 1− (n=1), then (y)(n) is (1)(3)+(3)(1)=6. The values of x, y, and z are often integers, although this is not required unless otherwise specified. The values of x, y, and z can be defined such that z is 0, X is 12, and (y·n) is 6, although this is also not required unless otherwise specified.

By adding a metal cation source and an aluminum reagent to the aqueous stream being processed, a metal cation alumino-oxoanion hydroxide hydrate precipitate can form. This precipitate can be separated from the aqueous stream to reduce the oxoanion concentration of the aqueous stream. For example, by adding a calcium source and an aluminum reagent source to a mine rock drainage containing calcium sulfate, a calcium-alumino-sulfate species can form that precipitates out the aqueous liquid. This precipitate can be removed from the mine rock drainage to reduce the sulfate concentration in the effluent.

In accordance with some examples of the present disclosure, it has been discovered that aluminum-based oxoanion precipitation does not follow an ettringite stoichiometric relationship between the metal cation (e.g., $Ca^{2+}$) and aluminum over the treatment range. For example, upon adding the metal cation source and the aluminum reagent to the oxoanion-containing stream, the resulting precipitate may exhibit a lower oxoanion concentration (corresponding to higher metal cation and aluminum concentrations) that would be provided according to ettringite stoichiometry in which the ratio of the metal cation to aluminum to oxoanion is 6:2:3. When this occurs, adding the metal cation source and the aluminum reagent to the aqueous stream being treated at ettringite stoichiometric ratios can suppress formation of the non-ettringite oxoanion precipitate. The excess metal cation and/or aluminum can shift the equilibrium of the oxoanion precipitation reaction, reducing the formation of the oxoanion precipitate.

Without wishing to be bound by any particular theory, it is believed that, in some cases, dosing at ettringite stoichiometry increases the length of time needed to arrive at a target oxoanion concentration in a water stream and/or increases the oxoanion concentration in the water stream after treatment, as compared to if dosing at non-ettringite stoichiometry. For example, it has been observed that in some application oxoanions precipitate with non-ettringite stoichiometry and, therefore, it is desirable to dose the metal cation source and/or the aluminum reagent at ratios and quantities corresponding to the non-ettringite stoichiometry of the precipitate formed. For example, the amount of metal cation source and aluminum reagent added to the water stream may be effective to achieve a ratio of metal cation source to aluminum in the stream corresponding to the ratio of the metal cation source to aluminum observed to form in the resultant precipitate having non-ettringite stoichiometry. The overall quantity of metal cation source and aluminum reagent added can further be dictated by the target level oxoanion for the water stream after treatment.

In applications where the oxoanion precipitates with ettringite stoichiometry, the metal cation source and the aluminum reagent may be added to the aqueous stream at an ettringite stoichiometric ratio (e.g., three moles of a divalent metal cation per mole of aluminum). By contrast, in applications where the oxoanion precipitates with non-ettringite stoichiometry, the metal cation source and the aluminum reagent may be added to the aqueous stream at amounts effective to provide non-ettringite stoichiometric ratios of the metal cation to aluminum to oxoanion within the aqueous stream.

For example, the amount of the metal cation source and the amount of the aluminum reagent to be added to the aqueous stream undergoing treatment may be selected based on the anticipated stoichiometry of the resultant oxoanion precipitate and the current metal cation concentration and the current oxoanion concentration in the aqueous stream. In practice, a test precipitate may be formed by adding the metal cation source and the aluminum reagent to a sample of the aqueous stream undergoing treatment. The resulting precipitate can be analyzed (e.g., in an analytical laboratory) to determine the stoichiometric ratios of the metal cation to aluminum to oxoanion in the precipitate. The stoichiometric ratios can vary depending on the specific oxoanions present in the stream undergoing treatment as well as the type of metal cation source and aluminum reagent selected as precipitating agents. The determined stoichiometric ratios of the precipitate can be established as the anticipated stoichiometry of the precipitate that will be formed during subsequent oxoanion precipitation and removal.

The ratio of the moles of metal cation to be added to the aqueous stream to the moles of aluminum to be added to the stream can vary, e.g., based on the anticipated stoichiometry of the resultant oxoanion precipitate and the metal cation source and aluminum reagent selected to be used as precipitating agents. In some examples, the amount of metal cation source added to the aqueous stream is effective to provide a metal cation concentration ranging from 2 moles of metal cation per mole of oxoanion targeted for removal to 20 moles of metal cation per mole of oxoanion targeted for removal, while the amount of aluminum reagent added to the aqueous stream is effective to provide an aluminum concentration ranging from 0.5 moles aluminum per mole of oxoanion targeted for removal to 8 moles aluminum per mole of oxoanion targeted for removal. The actual amount of metal cation source and aluminum reagent added to the aqueous stream to achieve these concentration levels will vary, e.g., based on the current metal cation concentration of the stream, the current oxoanion concentration of the stream, the volume of the stream, and the specific oxoanion species in the stream. The number of moles of oxoanion targeted for removal can be the difference between the current oxoanion concentration and the targeted oxoanion concentration after treatment. For example, if the aqueous stream undergoing treatment has a current oxoanion concentration of 1000 ppm and the target threshold oxoanion concentration after treatment is 200 ppm, the moles of oxoanion targeted for removal can correspond to the 800 ppm of oxoanion targeted for removal.

In practice, oxoanions may precipitate with non-ettringite stoichiometry. Accordingly, the metal cation source and aluminum reagent may be dosed so that the ratio of metal cation source to aluminum reagent in the stream undergoing treatment corresponds to (e.g., is substantially equal to) the non-ettringite stoichiometry of the precipitate. For example, the metal cation-oxoanion-aluminum precipitate formed may have a higher amount of metal cation and the same, lower, or higher amount of aluminum than would correspond to ettringite stoichiometry. For example, ettringite stoichiometry would normally correspond to a ratio of metal cation to aluminum to oxoanion of 6:2:3. When the oxoanion precipitates with non-ettringite stoichiometry, the ratio of metal cation to oxoanion may be greater than 6:3 while the ratio of aluminum to oxoanion may be less than, equal to, or greater than 2:3. The metal cation source and aluminum reagent may be dosed so that the ratio of metal cation source to aluminum reagent in the stream is within anyone of these foregoing ratios.

In addition, the ratio of the moles of metal cation to be added to the aqueous stream to the moles of aluminum to be added to the stream can vary depending on the species of oxoanion targeted for precipitation and removal and the concentration of the oxoanion in the stream. Different oxoanion species can form metal cation alumino-oxoanion hydroxide hydrate precipitates having different stoichiometric ratios of aluminum and metal cation. Further, the stoichiometric ratios may vary depending on the concentration of the oxoanion in the stream. Accordingly, adjusting the amount of the metal cation source and the aluminum reagent added to the aqueous stream undergoing treatment based on the species of oxoanion targeted for removal and/or the current concentration in the stream can improve removal efficiency. The following table shows exemplary target metal cation and aluminum concentrations for different oxoanion species targeted for precipitation and removal. The amount of metal cation source and the amount of aluminum reagent added to the aqueous stream undergoing treatment can be effective to provide concentrations and ratios in any of the foregoing ranges.

| Oxoanion | Moles Aluminum per Mole Oxoanion Targeted for Removal | Moles Divalent Cation per Mole Oxoanion Targeted for Removal | Ratio of Moles Divalent Cation per Mole Aluminum |
|---|---|---|---|
| Sulfate | 0.6 to 0.80 (e.g., 0.6 to 0.72) | 2.0 to 3.4 (e.g., 2.4 to 2.8) | 2.5 to 5.1 |
| Molybdate | 0.75 to 2.2 (e.g., 1.2 to 1.7) | 7.5 to 20 (e.g., 7.5) | 3.4 to 26.6 |
| Borate | 1 to 2.5 (e.g., 1.8 to 2.2) | 5 to 8 (e.g., 6) | 2 to 8 |
| Chromate | 1 to 4 (e.g., 2.7 to 3.3) | 3.5 to 9 (e.g., 3.5) | 0.9 to 9 |
| Nitrate | 6 to 8 (e.g., 6.5 to 7.5) | 15 to 20 (e.g., 17) | 1.9 to 3.3 |

In operation, the amount of the metal cation source and the amount of the aluminum reagent to be added to the aqueous stream undergoing treatment can be determined based on the current metal cation concentration, the current oxoanion concentration in the aqueous stream, and/or the anticipated stoichiometry of the resultant oxoanion precipitate to be formed. Additionally, the amount of the metal cation source and the amount of the aluminum reagent to be added to the aqueous stream undergoing treatment can be based on a target amount of oxoanion to be removed from the aqueous stream (e.g., corresponding to an amount of oxoanion that can remain in the aqueous stream after treatment).

The metal cation source and the aluminum reagent to be added to the aqueous stream in amounts effective to provide the metal cation and aluminum reagent in the aqueous stream at a ratio corresponding to (e.g., equal to) the anticipated stoichiometry of the resultant oxoanion precipitate. Typically, it will be expected that there is little or no aluminum present in the incoming aqueous stream containing the oxoanion such that any aluminum needed for precipitation will be provided by the aluminum reagent. For this reason, the aluminum concentration in the aqueous stream may not be continuously measured to monitor changes in the aluminum content of the stream (although, in other examples, the aluminum concentration may also be monitored to determine a current aluminum concentration and the aluminum reagent also dosed based on the current aluminum concentration). By contrast, the incoming aqueous stream containing the oxoanion may contain metal cation having a variable concentration over time. The determined current metal cation concentration in the stream can be used to adjust the amount of the metal cation source added to the stream such that metal cation and aluminum reagent present in the aqueous stream after addition of the precipitating agents are at a ratio corresponding to the anticipated stoichiometry of the resultant oxoanion precipitate.

In addition, the determined current oxoanion concentration in the stream can be used to adjust the amounts of both the metal cation source and the aluminum reagent added to the stream. In many applications, it is desired to treat the aqueous stream containing an oxoanion species to reduce the concentration of the oxoanion species below a threshold concentration level. The concentration level may be a regulatory level (e.g., maximum concentration limit) beyond which the aqueous stream cannot be discharged to the environment. Accordingly, the amount of the metal cation source and the aluminum reagent added to the stream may be effective to reduce the concentration of an oxoanion species in the stream from the current oxoanion concentration to below the threshold concentration level.

In various examples, the amount of the metal cation source and the aluminum reagent added to the aqueous stream is effective to precipitate at least 10 wt % of an oxoanion species present in the aqueous stream undergoing treatment, such as at least 25 wt %, at least 50 wt %, or at least 75 wt %. For example, the amount of the metal cation source and the aluminum reagent added to the aqueous stream can be effective to precipitate from 10 wt % of the oxoanion species present the aqueous stream to 80 wt % of the species, such as from 25 wt % of the species to 65 wt % of the species.

The specific target concentration threshold for the oxoanion in the treated aqueous stream will vary depending on the oxoanion being removed from the stream. Further, in instances where multiple different oxoanion species are targeted for removal from the aqueous stream, there may be multiple target concentration thresholds for the oxoanions in the treated aqueous stream, with different thresholds corresponding to different oxoanion species. In the case of sulfate, the target concentration threshold for sulfate in the treated aqueous stream may be less than 2000 ppm, such as less than 1000 ppm, less than 500 ppm, less than 200 ppm, or less than 100 ppm. For example, the target concentration threshold for sulfate in the treated aqueous stream may range from 50 ppm to 1200 ppm, such as from 100 ppm to 750 ppm, from 200 ppm to 1000 ppm, of from 100 ppm to 400 ppm. The amount of the metal cation source added to the aqueous stream (if any) and the amount of the aluminum reagent added to the aqueous stream can be effective to reduce the concentration of the oxoanion in the aqueous stream to below or within any of the foregoing values or ranges.

In some cases, an operator may desire to remove substantially all oxoanion present in the aqueous stream undergoing treatment such that the treated aqueous stream has a low oxoanion concentration (e.g., less than 50 ppm oxoanion, less than 15 ppm oxoanion, less than 5 ppm oxoanion). In these applications, the amount of the metal cation source and the amount of the aluminum reagent added to the aqueous stream undergoing treatment can be selected to be effective to precipitate substantially all of the oxoanion present in the stream. In other cases, it may be desired to remove less than substantially all oxoanion present in the aqueous stream undergoing treatment, for example, by only reducing the oxoanion concentration below a non-zero target concentration level. This can limit the cost of treating the aqueous stream by reducing the quantity of precipitating agent added to the stream.

Any suitable metal cation source(s) and aluminum reagent(s) can be used to reduce the oxoanion concentration of an aqueous stream undergoing treatment. Selection of a specific metal cation source and aluminum reagent may be based on factors such as cost, toxicity of the precipitating agents and resulting precipitate, and chemical compatibility with the oxoanion being precipitated and other species in the aqueous stream.

In different examples, the metal cation source can be a source that provides Group I (alkali metal) cations, divalent metal cations (e.g., iron (II), calcium, magnesium), and/or Group II (alkaline earth metal) cations. The metal cation source may or may not be basic such that addition of the metal cation source to the aqueous stream increases the pH of the stream. Example metal cation sources include, but are not limited to, calcium hydroxide, calcium oxide, calcium chloride, magnesium hydroxide, dolomitic lime, fly ash, and clay. The metal cation source can be supplied as a solid, solution, or slurry.

Any suitable source of aluminum for forming an aluminum-based oxoanion precipitate can be used as the aluminum reagent. The aluminum reagent may be basic such that addition of the aluminum reagent to the aqueous stream increases the pH of the stream, acidic such that addition of the aluminum reagent to the aqueous stream reduces the pH of the stream, or substantially pH neutral. Example aluminum reagents include, but are not limited to, alum (aluminum sulfate), sodium aluminate, calcium aluminate, aluminum chloride, polyaluminum chloride, aluminum hydroxide, aluminum acetate, aluminum nitrate, and fly ash. While the aluminum reagent and metal cation source are generally described as being separate precipitating agents, in other examples, a single precipitating agent can function as both the aluminum reagent and metal cation source. For example, when calcium aluminate is used, the calcium aluminate can function as both a metal cation source and an aluminum source. Regardless, the aluminum reagent can be supplied as a solid, solution, or slurry.

As one non-limiting example of how the amount of the metal cation source and the amount of the aluminum reagent can be determined based on current metal cation concentration and the current oxoanion concentration in the aqueous stream, assume the aqueous stream to be treated contains 2000 ppm calcium sulfate (corresponding to a current metal cation concentration of 589 ppm of $Ca^{2+}$ and a current oxoanion concentration of 1411 ppm of $SO_4^{2-}$). Assume further that the target concentration for the sulfate in the treated aqueous stream is 200 ppm and the metal cation source is calcium hydroxide and the aluminum reagent is sodium aluminate. If the aluminum-based oxoanion precipitate formed is assumed to have a stoichiometric ratio of calcium to aluminum to sulfate of 8.02 to 2 to 3.34, then an amount of calcium hydroxide and aluminum reagent that should be added to the aqueous stream is 510 ppm sodium aluminate and 762 ppm calcium aluminate.

The example technique of FIG. 1 includes adding the selected precipitating agent(s) to the aqueous stream containing oxoanions (18) at the determined dosing level(s). The metal cation source and the aluminum reagent can be added simultaneously to the aqueous stream undergoing treatment or sequentially. In one example, the aluminum reagent is added to the aqueous stream before adding the metal cation source. Upon addition, the aluminum reagent can begin complexing with metal cations already present in the aqueous stream, forming a metal cation-alumino-oxoanion species. The metal cation source can then be added to the aqueous stream to provide additional cations to complete formation of the metal cation-alumino-oxoanion species and/or react additional unprecipitated oxoanion molecules present in the aqueous stream.

In some examples, the aluminum reagent and metal cation source are mixed or blended into an aqueous stream or static aqueous solution containing an oxoanion to be precipitated, e.g., by using a driven agitator or static mixer. In other examples, the aluminum reagent and metal cation source are injected into a flowing aqueous stream and the turbidity of the stream is allowed to mix the precipitating reagents throughout the stream. Although reaction times can vary, in some examples, the aluminum reagent is mixed with the aqueous stream for at least 5 minutes (e.g., from 5 minutes to 30 minutes) before adding the metal cation source to the stream. Subsequent to adding the metal cation source to the aqueous stream, the resultant solution can be mixed for at least 20 minutes (e.g., from 30 minutes to 1 hour) to effect formation of the oxoanion precipitate.

To form a metal cation-alumino-oxoanion precipitate upon addition of the aluminum reagent and/or metal cation source, the pH of the aqueous stream may need to be adjusted to a range where the precipitate will form. Ettringite-type precipitates typically form within a pH range of 10.5 to 13 (e.g., 11 to 13). Accordingly, in these applications, the pH range of aqueous stream may be adjusted to a pH range of 10.5 to 13 (e.g., 11 to 13) by adding a base to aqueous stream. In some examples, the metal cation source and/or aluminum reagent functions as a base such that addition of the metal cation source and/or aluminum reagent is sufficient to increase the pH of the stream to a range where a metal cation alumino-oxoanion hydroxide hydrate precipitate will form. For example, when magnesium or calcium hydroxide is used as the metal cation source, the magnesium or calcium hydroxide can both supply metal cations to the aqueous stream and increase the pH of the stream. In other examples, a separate base (e.g., a hydroxide source) will be added to the aqueous stream in addition to the metal cation source and aluminum reagent, such as sodium hydroxide or potassium hydroxide.

Once formed, the metal cation alumino-oxoanion precipitate can be removed from the aqueous stream undergoing treatment using any suitable solid-liquid separation process. Example separation techniques include, but are not limited to, filtration, centrifugation, decanting, and gravity settling. After separating the precipitated oxoanion from the aqueous stream, the remaining stream can be recycled and reused within an industrial process or discharged to a suitable outlet, such as a river, lake, or sewer system. The pH of the stream after removing the precipitant may be reduced by adding an acid or acid generating agent (e.g. carbon dioxide) before recycling or discharging the stream. After treatment, the treated water can meet regulatory requirements regarding oxoanion content and can be returned to productive industrial use or the environment.

Figure 2:
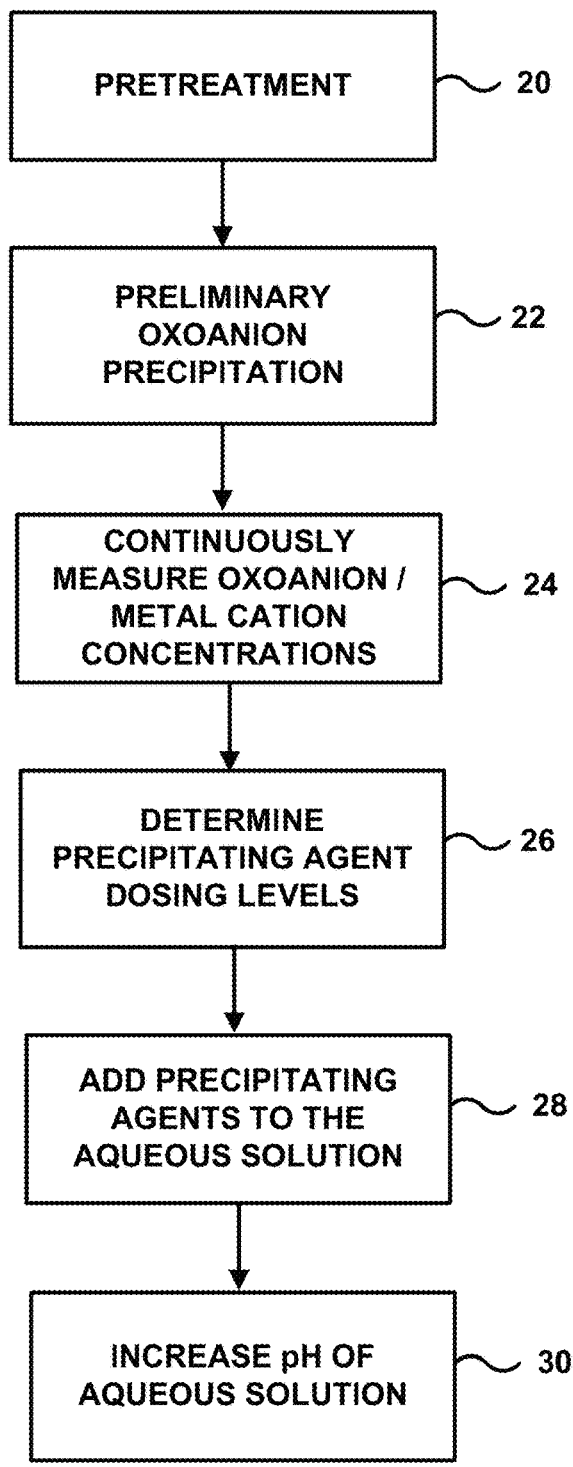
FIG. 2 is a flow diagram illustrating another example process for reducing a concentration of one or more oxoanions in an aqueous stream.

FIG. 2 is a flow diagram illustrating another example process for reducing a concentration of one or more oxoanions in an aqueous solution, such as a reservoir or flowing stream of water containing oxoanions to be treated. The process of FIG. 2 can be performed independently of, or in conjunction with, the example process of FIG. 1. The aqueous solution can be received from a variety of different industrial processes and have any metal cation and oxoanion species at any concentration levels, as discussed above with respect to FIG. 1. In some examples, the aqueous solution is discharge, effluent, run-off, and/or seepage from a mine, coal refuse pile, construction site, chemical plant, or other location.

In the technique of FIG. 2, the aqueous solution containing the oxoanion species to be treated is subject to an optional pretreatment step (20). The pretreatment step (20) can mechanically filter the solution, e.g., by performing membrane separation, microfiltration, nanofiltration, reverse osmosis, forward osmosis, or sand filtration. This can concentrate the oxoanions into a reject stream for further processing. Additionally or alternatively, a chemical precipitating agent can be added to the solution to precipitate heavy metals out of the solution. For example, when the aqueous solution contains heavy metals such as iron, chromium, cobalt, zinc, and/or nickel, a hydroxide source can be added to the solution to precipitate the heavy metals out of the solution. When used, a hydroxide source such as a peroxide or hydroxide can be added to the aqueous solution in an amount effective to precipitate substantially all of the heavy metals present in the solution. The precipitated heavy metals can be removed from the solution before performing further processing.

After performing the optional pretreatment step (20), the technique of FIG. 2 includes an optional preliminary oxoanion precipitation step (22). The preliminary oxoanion precipitation step (22) can be useful for aqueous solutions having a high concentration of an oxoanion species needing removal before the solution is suitable for discharge. To precipitate a portion of the oxoanion out of the solution during the preliminary oxoanion precipitation step (22), a basic alkaline earth metal reagent can be added to the aqueous solution containing the oxoanion. Example basic alkaline earth metal reagents include, but are not limited to, lime, hydrated lime, calcium carbonate, calcium silicate, calcium hydroxide, calcium oxide, and gypsum (e.g., in cases where the solution is super saturated) and any combination thereof. The basic alkaline earth metal reagent can be dosed at a molar equivalence of approximately one mole of reagent per mole of oxoanion targeted for removal, or higher or lower doses, as appropriate. Addition of the basic alkaline earth metal reagent to the aqueous solution can precipitate a first portion of the oxoanion out of the aqueous solution and generate an aqueous solution have a reduced concentration of the oxoanion.

For example, in applications where the aqueous solution contains calcium sulfate, the addition of a calcium hydroxide-containing precipitating agent such as lime can form a gypsum precipitate. The lime can be added as a slurry or other form and mixed for a suitable period of time (e.g., 30 to 60 minutes) to allow for complete precipitation of the gypsum. In some examples, gypsum seed crystals from an earlier precipitation are added to help initiate precipitation of the gypsum from the solution. Once formed, the gypsum precipitate can be removed from the aqueous solution using solid-liquid separation techniques to reduce the concentration of the oxoanion in the solution for further processing. Because gypsum is generally soluble in water, some sulfate oxoanion (e.g., from 1100 ppm to 1500 ppm) may remain in the aqueous solution and necessitate further treatment.

To help control dosing of the basic alkaline earth metal reagent (when used), the metal cation concentration and the oxoanion concentration in the aqueous solution can be continuously monitored, as discussed above with respect to FIG. 1, to provide a current metal cation concentration and/or a current oxoanion concentration. The amount of basic alkaline earth metal reagent added to be aqueous solution can be based on the current metal cation concentration and/or a current oxoanion concentration. In other applications, the basic alkaline earth metal reagent is added to the aqueous solution without measuring the current metal cation concentration and/or current oxoanion concentration in the solution, e.g., based on historical target dosing information. In yet further examples, such as when the oxoanion concentration in the incoming aqueous solution is comparatively low (e.g., 1500 ppm oxoanion or less), the preliminary oxoanion precipitation step (22) may be omitted entirely.

Independent of whether the current metal cation concentration and/or the current oxoanion concentration of the aqueous solution is continuously monitored before adding the optional basic alkaline earth metal reagent to control its dosing (22), the technique of FIG. 2 includes continuously measuring the concentration of one or more metal cation species and one or more oxoanion species in the solution (24) to determine precipitation agent dosing levels (26) and adding the precipitating agents at the determined dosing levels to the solution (28). As discussed above in connection with FIG. 1, the amount of the metal cation source and the amount of the aluminum reagent to be added to the aqueous solution undergoing treatment can be determined based on the current metal cation concentration in the solution, and/or the current oxoanion concentration in the solution, and/or the anticipated stoichiometry of the resultant oxoanion precipitate to be formed. Further, the amount of the metal cation source and the amount of the aluminum reagent to be added to the aqueous solution can be based on a target amount of oxoanion to be removed from the aqueous solution (e.g., corresponding to an amount of oxoanion that can remain in the aqueous stream after treatment). The amount of the metal cation source and/or the aluminum reagent to be added to the aqueous solution can be determined by and fall within the range of values discussed above with respect to FIG. 1.

In applications where the preliminary oxoanion precipitation step (22) is performed to generate an aqueous solution having a reduced concentration of the oxoanion species targeted for reduction, the metal cation source and/or aluminum reagent can be added to the solution having the reduced concentration of the oxoanion species. This can precipitate a second portion of the oxoanion species out of the aqueous solution (the first portion being precipitated during the preliminary oxoanion precipitation step), forming an aqueous solution having a further reduced concentration of the oxoanion.

In some examples, the addition of increasing amounts of metal cation source and/or aluminum reagent may increase the amount of precipitate formed—and correspondingly the amount of oxoanion consumed from the aqueous solution—until a concentration inflection point is reached for the metal cation source and/or aluminum reagent. Increasing the concentration of the metal cation source and/or aluminum reagent in the aqueous solution being treated beyond the inflection point can reduce the amount of precipitate formed, increasing the amount of oxoanion remaining in the solution after treatment.

In these situations, the amount of metal cation source and/or aluminum reagent added to the aqueous solution may be selected so as to maximize the amount of oxoanion precipitated out of the solution. For example, the aqueous solution may be analyzed by incrementally increasing the amount of metal cation source and/or aluminum reagent added to the solution and measuring the amount of precipitate formed/concentration of unbound oxoanion remaining in the solution. The amount of metal cation source and/or aluminum reagent effective to maximize oxoanion precipitation can be determined by identifying concentration inflection point(s) whereby adding a lesser amount or a greater amount of the metal cation source and/or aluminum reagent reduces the amount of oxoanion precipitated. The metal cation source and/or aluminum reagent can subsequently be added to the aqueous solution in amounts corresponding to those determined to be effective to maximize the amount of oxoanion precipitated out of the aqueous solution.

As discussed above in connection with FIG. 1, the pH of the aqueous solution may be adjusted concurrent with or subsequent to adding the metal cation source and/or aluminum reagent to the solution. For example, the pH may be adjusted to a range of 10.5 to 13 (e.g., 11 to 13) by using a basic metal cation source and/or aluminum reagent and/or by adding a pH-adjusting base to the solution in addition to the metal cation source and the aluminum reagent. Once formed, a metal cation alumino-oxoanion precipitate can be removed from the aqueous solution undergoing treatment using any suitable solid-liquid separation process, including those discussed above with respect to FIG. 1.

After removing the oxoanion precipitate from the remaining aqueous solution, the technique of FIG. 2 includes optionally decreasing the pH of the aqueous solution before discharging the solution. Any suitable acids can be used to decrease the pH of the aqueous solution, including weak organic acids and strong mineral acids. In one example, the aqueous solution is subject to carbonation by injecting carbon dioxide into the stream. The carbon dioxide can react with a metal hydroxide (e.g., calcium hydroxide) forming a metal carbonate and decreasing the pH of the solution. After treatment, the treated water can meet regulatory requirements regarding oxoanion content and can be returned to productive industrial use or the environment.

The techniques described in this disclosure can be implemented as an automated system that measures the oxoanion concentration and/or metal cation concentration of an aqueous solution, such as an aqueous stream, undergoing treatment. Using the determined oxoanion concentration and/or metal cation concentration and dosing concentration/rate information stored in memory, the automated system can determine the amount of aluminum reagent, metal cation source, and/or other reagents to add to the solution to achieve a desired oxoanion concentration reduction. In some applications, the automated system can control pumps, injection valves, and/or other fluid or solids handling mechanisms to add the aluminum reagent, metal cation source, and/or other reagents to the aqueous solution at the determined amounts.

When implemented as an automated system, the monitoring, analysis, and determination techniques of the disclosure can be implemented in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. Such hardware, software, firmware may be implemented within the same device or within separate devices to support the various operations and functions described in this disclosure. When implemented in software, the functionality ascribed to the systems, devices and techniques described in this disclosure may be embodied as instructions on one or more non-transitory computer-readable medium such as RAM, ROM, NVRAM, EEPROM, FLASH memory, magnetic data storage media, optical data storage media, or the like. The instructions may be executed to support one or more aspects of the functionality described in this disclosure.

Figure 3:
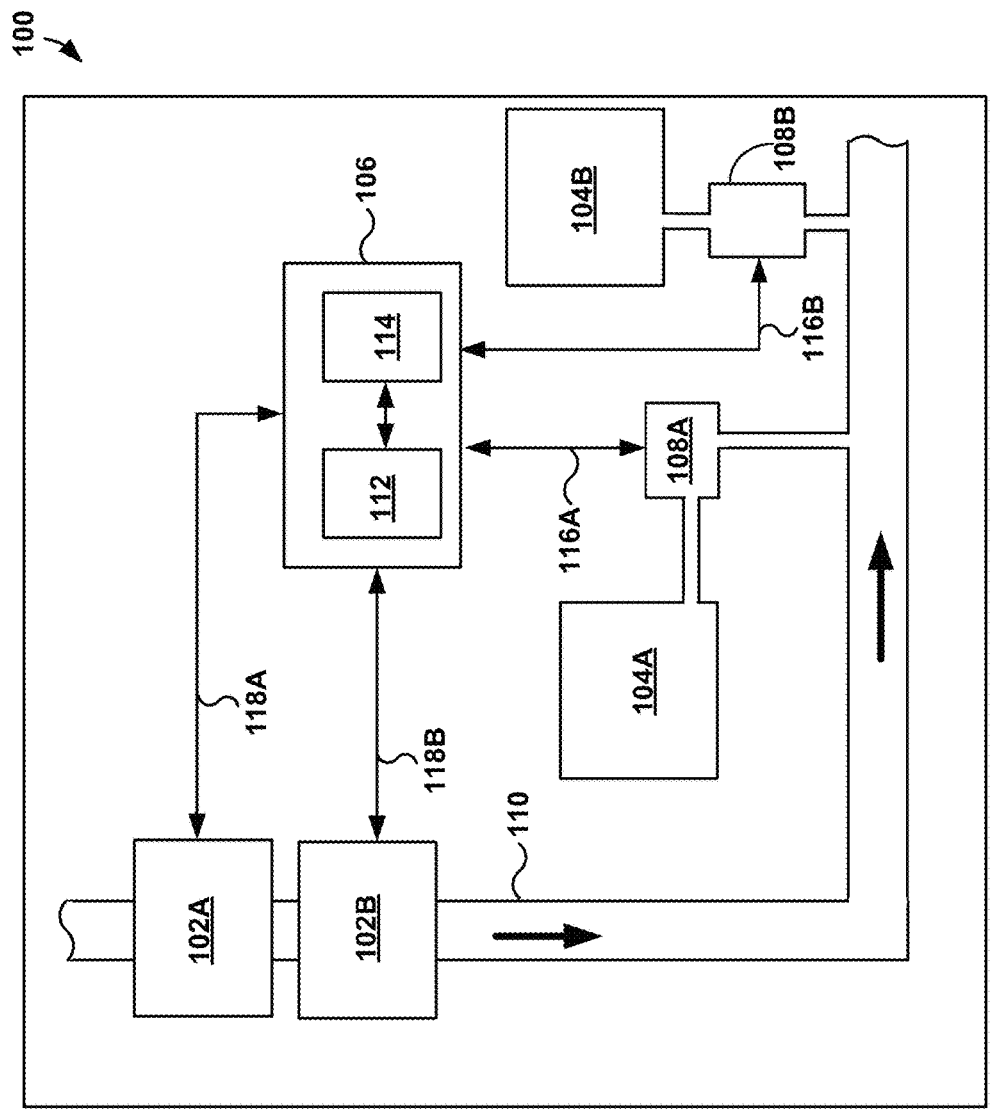
FIG. 3 is a conceptual diagram illustrating an example system, which may be used to treat water containing oxoanions to reduce the concentration of the oxoanions according to the techniques described in connection with FIGS. 1 and 2.

FIG. 3 is a conceptual diagram illustrating an example system 100, which may be used to treat water containing oxoanions to reduce the concentration of the oxoanions according to the techniques described in connection with FIGS. 1 and 2. System 100 includes one or more sensors, which is illustrated as a first sensor 102A and a second sensor 102B. System 100 also includes a first reservoir 104A, a second reservoir 104B, a controller 106, a first pump 108A, and a second pump 108B. First and second reservoirs 104A and 104B may each store and function as a source of chemical agent that can be blended with a aqueous stream undergoing treatment. For example, first reservoir 104A can store an agent containing metal cations and second reservoir 104B can store an aluminum reagent. First and second sensors 102A and 102B are configured to receive samples of the aqueous stream undergoing treatment and analyze the stream to determine a characteristic of the stream. For example, first sensor 102A can continuously measure a concentration of metal cations in the aqueous stream so as to provide data indicative of the current metal cation concentration in the stream and second sensor 102B can continuously measure a concentration of oxoanions in the aqueous stream so as to provide data indicative of the current oxoanion concentration in the stream. First and second sensors 102A and 102B can be implemented using any hardware or combinations of hardware needed to implement the sensory techniques discussed above in connection with FIGS. 1 and 2.

In operation, first and second sensors 102A and 102B can communicate with controller 106, and controller 106 can control system 100 based on the concentration information generated by the sensors. Controller 106 is communicatively connected to first and second sensors 102A and 102B and also to first and second pumps 108A and 108B. Controller 106 includes processor 112 and memory 114. Controller 106 communicates with first and second pumps 108A and 108B via respective first and second connections 116A and 116B. Signals generated by first and second sensors 102A and 102B are communicated to controller 106 via a wired or wireless connection, which in the example of FIG. 3 is illustrated as wired connections 118A and 118B. Memory 114 stores software for running controller 106 and may also store data generated or received by processor 112, e.g., from first and second sensors 102A and 102B. Processor 112 runs software stored in memory 114 to manage the operation of system 100.

In the example of FIG. 3, system 100 is configured to reduce the concentration of one or more oxoanions present in an aqueous stream undergoing treatment. For example, system 100 can control addition of a metal cation source from first reservoir 104A and an aluminum reagent from second reservoir 104B based on a current metal cation concentration determined using first sensor 102A and a current oxoanion concentration determined using second sensor 102B. Under the control of controller 106, first sensor 102A can receive a portion of the aqueous stream undergoing treatment and analyze the portion of the stream to determine a current metal cation concentration. Also operating under the control of controller 106, second sensor 102B can receive a portion of the aqueous stream undergoing treatment and analyze the portion of the stream to determine a current oxoanion concentration. In other configurations, system 100 may utilize a single sensor to measure both the current metal cation concentration and current oxoanion concentration. Alternatively, system 100 may include yet additional sensor (e.g., a sensor to measure the current aluminum concentration) and control addition of precipitating agents based on data from the additional sensor.

In response to concentration data generated by first and second sensors 102A and 102B, controller 106 can control first and second pumps 108A and 108B to mechanically pump a defined quantity of chemical agent out of first and second reservoirs 104A and 104B, respectively. The chemical precipitating agents supplied from first and second reservoirs 104A and 104B can combine with the water stream undergoing treatment to precipitate oxoanions out of the stream. In some examples, a mixer (e.g., static mixer, driven mixer) is included in system 100 to mix chemical precipitating agents added to the water stream undergoing treatment.

In some examples, processor 112 of controller 106 receives concentration information from first and second sensors 102A and 102B and compares the information to one or more thresholds stored in memory 114, such as one or more concentration thresholds. Based on the comparison, controller 106 may adjust system 100, e.g., so that the concentration of metal cation and concentration of aluminum added to the water stream is appropriate for the concentration of oxoanions present in the stream undergoing treatment. For example, controller 106 may adjust system 100 based on the current metal cation concentration and current oxoanion concentration so as to provide a dosing ratio of precipitating agents corresponding to a precipitation stoichiometry of the oxoanion being removed via precipitation. Controller 106 may also adjust system 100 based on user input setting a target threshold below which the concentration of oxoanion is desired to be reduced so as to control the overall amount of precipitating agent to be added to the water stream undergoing treatment. Controller 106 may be so informed of such a target threshold by receiving user input via a user interface device and storing the input in memory 114.

For example, controller 106 may adjust system 100 based on the current metal cation concentration and current oxoanion concentration so as to dose an agent containing metal cations and an aluminum reagent to the water stream undergoing treatment in amounts effective to provide a ratio of moles of metal cation to moles of oxoanion ranging from 2 to 20 and a ratio of moles of aluminum to moles of oxoanion ranging from 0.6 to 8. In the case of the oxoanion sulfate, for instance, controller 106 may adjust system 100 based on the current metal cation concentration and current oxoanion concentration so as to dose an agent containing metal cations and an aluminum reagent to the water stream undergoing treatment in amounts effective to provide a ratio of moles of metal cation to moles of oxoanion ranging from 2 to 3.4 and a ratio of moles of aluminum to moles of oxoanion ranging from 0.6 to 0.8. It should be appreciated that the foregoing dosing ratios are merely examples, and other dosing ratios can be used as described herein.

In FIG. 3, controller 106 can control the addition of precipitating agents to the water stream undergoing treatment by controlling first and second pumps 108A and 108B. In different examples, controller 106 starts and/or stops pumps 108A and/or 108B or increases and/or decreases the rate of pumps 108A and/or 108B to adjust the concentration of a chemical compound flowing through fluid pathway 110. Starting pumps 108A and/or 108B or increasing the operating rate of pumps 108A and/or 108B can increase the amount of precipitating agent dosed from the respective pump(s) to fluid pathway 110. Stopping pumps 108A and/or 108B or decreasing the operating rate of pumps 108A and/or 108B can decrease the amount of precipitating agent dosed from the respective pump(s) to fluid pathway 110. In other examples, controller 106 may be communicatively coupled to a valve or other fluid control mechanism in addition to or in lieu of pumps 108A and/or 108B to control addition of precipitating agents from first and second reservoirs 104A and 104B.

First and second sensors 102A and 102B may be implemented in a number of different ways in system 100. In the example shown in FIG. 3, first and second sensors 102A and 102B are positioned in-line with fluid pathway 110 to determine a concentration of the fluid flowing through the fluid pathway. In other examples, a pipe, tube, or other conduit may be connected between fluid pathway 110 and first and second sensors 102A and 102B. In such examples, the conduit can fluidly connect the first and second sensors 102A and 102B to fluid pathway 110. As fluid moves through fluid pathway 110, a portion of the fluid may enter the conduit and pass to the first and second sensors 102A and 102B for analysis. In yet other examples, first and/or second sensors 102A and 102B may be implemented as offline sensors and the data generated by the sensors supplied to controller 106 for controlling system 100.

System 100 in the example of FIG. 3 also includes first and second reservoirs 104A and 104B, first and second pumps 108A and 108B, and fluid pathway 110. First and second reservoirs 104A and 104B may be any type of container that stores a chemical agent for subsequent delivery including, e.g., a tank, a tote, a bottle, and a box. First and second reservoirs 104A and 104B may store a liquid, a solid (e.g., powder), and/or a gas. First and second pumps 108A and 108B may be any form of pumping mechanism that supplies fluid from a fluidly connected reservoir. For example, the pumps may comprise a peristaltic pump or other form of continuous pump, a positive-displacement pump, or any other type of pump appropriate for the particular application. In examples in which first and/or second reservoir 104A and 104B stores a solid and/or a gas, first and/or second pump 108A and 108B may be replaced with a different type of metering device configured to deliver the gas and/or solid chemical agent to an intended discharge location. Fluid pathway 110 in system 100 may be any type of flexible or inflexible tubing, piping, or conduit.

System 100 described in connection with FIG. 3 is merely one example of a system and arrangement of hardware that can be used to implement the techniques described above in connection with FIGS. 1 and 2. It should be appreciated that other systems and hardware arrangements can be used, and the disclosure is not limited in this respect.

The following examples may provide additional details about oxoanion treatment systems and techniques in accordance with this disclosure.

EXAMPLES

Example 1: Final Sulfate from Aluminum+Ca(OH)$_2$ Treatment of Lime Pretreated ARD ARD from a mine site in Nevada containing 8333 ppm sulfate was treated with calcium hydroxide (1.1 moles calcium/mole) and powdered gypsum seed crystals (15 grams/liter) for one hour to yield a solution containing 1200 ppm of sulfate and 700 ppm of calcium. Sodium sulfate was added to a portion of this water to bring the sulfate level up to 1600 ppm. Portions of this solution were treated with varying levels of a 32% solution of sodium aluminate. A 10% slurry of powdered calcium hydroxide was added to each portion to bring the total calcium present to 1700 ppm. After 30 minutes the stirred mixtures were filtered and the filtrate analyzed to determine the sulfate concentration.

Figure 4:
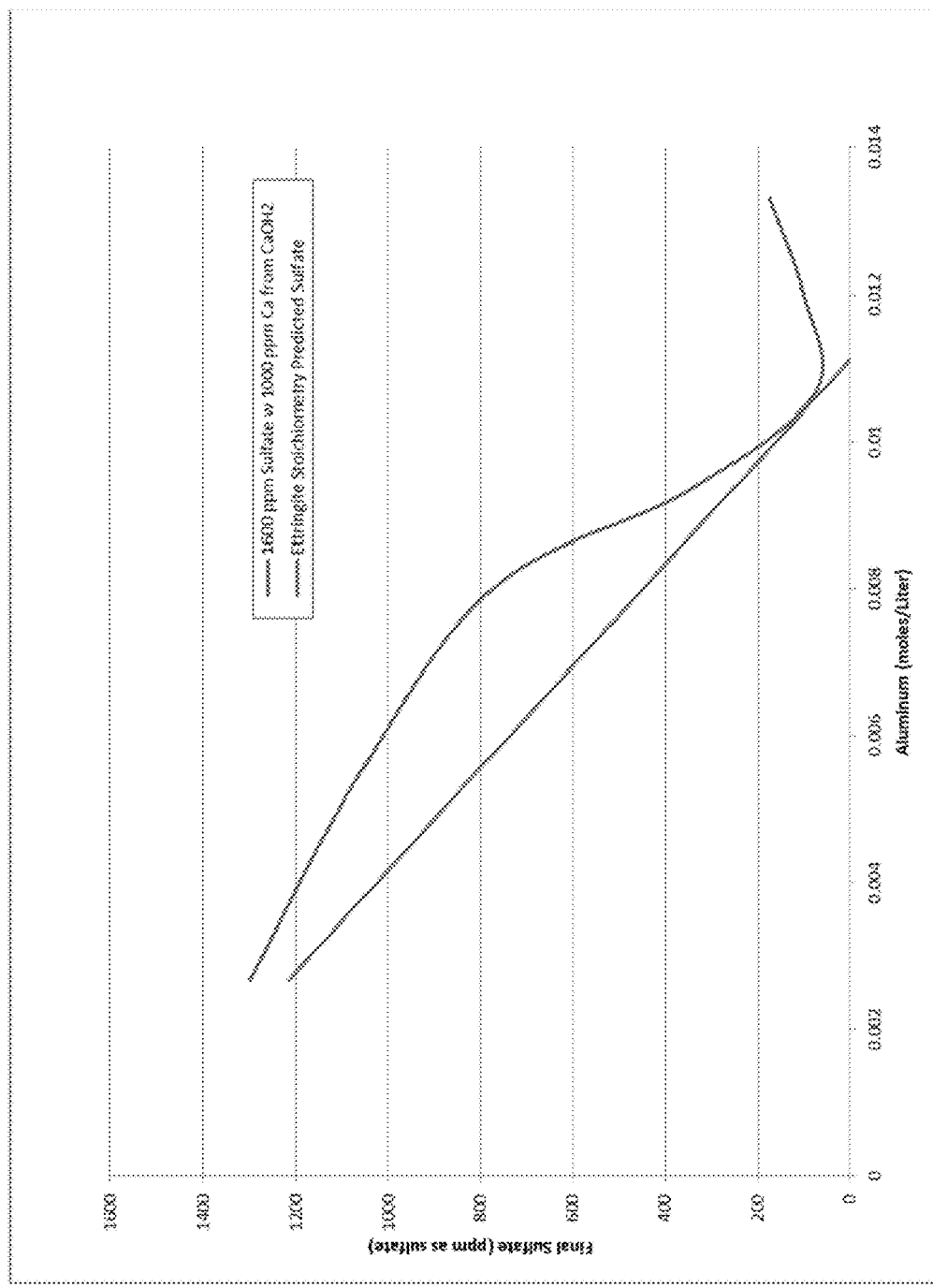
FIG. 4 is a plot of showing example experimental sulfate oxoanion concentration data compared to concentration data predicted for a precipitate assuming ettringite stoichiometry.

Table 1 below and FIG. 4 show the sulfate concentration in the filtrate as a function of aluminum concentration. The data show that the sulfate decreased with increasing aluminum addition (at a fixed calcium concentration) up until an inflection at which point the sulfate began increasing with increasing aluminum addition. For reference, the experimental data are compare with ettringite precipitation stoichiometry, which would predict complete precipitation of all sulfate with increasing aluminum addition.

TABLE 1

| Aluminum Moles/ Liter | Dissolved Sulfate After Precipitation (experimental) | Precipitate Moles Al/3 Moles Sulfate (experimental) | Ettringite Stoichiometry Predicted Sulfate | Ettringite Predicted Moles Al/3 Moles Sulfate |
|---|---|---|---|---|
| 0.0027 | 1300 | 2.56 | 1215 | 2 |
| 0.0053 | 1075 | 2.92 | 833 | 2 |
| 0.0080 | 775 | 2.79 | 449 | 2 |
| 0.0093 | 350 | 2.15 | 257 | 2 |
| 0.0107 | 75 | 2.01 | 64 | 2 |
| 0.0111 |  |  | 0 | 2 |
| 0.0120 | 100 | 2.30 |  |  |
| 0.0133 | 175 | 2.69 |  |  |

Example 2: Precipitation Kinetics Treatment of Lime Pretreated ARD

Four kilograms of ARD from a mine site in Nevada containing 8333 ppm sulfate was treated with calcium hydroxide (1.1 moles calcium/mole sulfate) and powdered gypsum seed crystals (15 grams/liter) for one hour. The slurry was filtered to yield 3599.5 grams of solution and 490 grams of wet gypsum. The solution contained 1550 ppm of sulfate and 741 ppm of calcium. Four portions of the solution were treated with 32% sodium aluminate solution and 10% calcium hydroxide slurry. In test solution 1 the sodium aluminate and calcium hydroxide doses were selected to achieve a 2 Al/6 Ca/3 SO$_4^{2-}$ molar ratio in the target precipitate and 0 ppm dissolved sulfate in the final solution. In test solution 2 the sodium aluminate and calcium hydroxide doses were selected to achieve a 2 Al/6 Ca/3 SO$_4^{2-}$ molar ratio in the target precipitate and 200 ppm dissolved sulfate in the final solution. In test solution 3 the sodium aluminate and calcium hydroxide doses were selected to achieve a 2 Al/6.6 Ca/3 SO$_4^{2-}$ molar ratio of in the target precipitate and 200 ppm dissolved sulfate in the final solution. In test solution 4 the sodium aluminate and calcium hydroxide doses were selected to achieve a 2 Al/7.2 Ca/3 SO$_4^{2-}$ molar ratio in the target precipitate and 200 ppm dissolved sulfate in the final solution.

Figure 5:
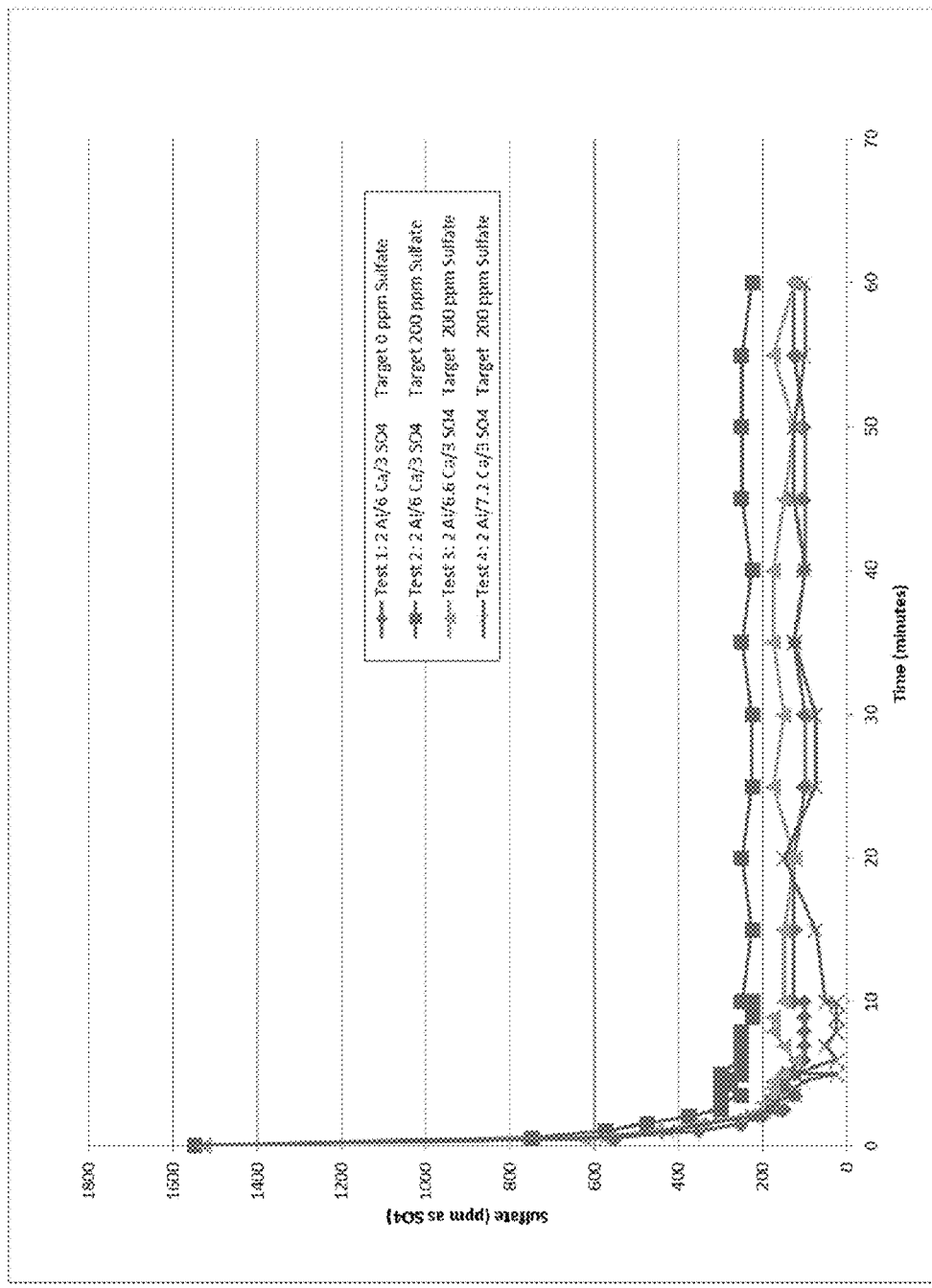
FIG. 5 is plot of example precipitation kinetic data for an example lime pretreated acid rock drainage sample.

After addition of the sodium aluminate solution, the solution was mixed for 5 minutes and then the calcium hydroxide slurry was added. Portions of the mixture were then removed at select intervals, filtered and analyzed to determine the concentration of soluble sulfate. The results are shown in FIG. 5. The average final sulfate (average of sulfate after 10 minutes) is shown in Table 2 below. As seen in the figure, the final sulfate level is lower after addition of greater than ettringite-stoichiometry calcium. Unexpectedly, the non-ettringite stoichiometry of test 4 removed more sulfate than an ettringite stoichiometry (13% more aluminum and 20% less calcium than the non-ettringite test).

TABLE 2

|  | Test 1 | Test 2 | Test 3 | Test 4 |
|---|---|---|---|---|
| Final Sulfate Target (ppm) | 0 | 200 | 200 | 200 |
| Target Precipitate Al/Ca/SO4 | 2/6/3 | 2/6/3 | 2/6.6/3 | 2/7.2/3 |
| Average Final Sulfate (ppm) | 113 | 238 | 152 | 94 |

Example 3: Aluminum+Ca(OH)$_2$ Treatment of Lime Pretreated ARD

Four kilograms of ARD from a mine site in Nevada containing 8333 ppm sulfate was treated with calcium hydroxide (1.1 moles calcium/mole sulfate) and powdered gypsum seed crystals (15 grams/liter) for one hour to yield a solution containing 1550 ppm of sulfate and 741 ppm of calcium. The slurry was filtered to yield 3600 grams of solution and 490 grams of wet gypsum. A one kilogram portion of the solution was treated with 2.4 grams of 32% sodium aluminate solution and 7.13 grams of 10% calcium hydroxide slurry to target ettringite stoichiometry for precipitation of 1350 ppm of sulfate as ettringite (200 ppm dissolved sulfate) with no excess aluminum or calcium. A second one kilogram portion of the lime pretreated ARD solution was treated with 2.4 grams 32% sodium aluminate solution and 10.21 grams of 10% calcium hydroxide slurry to target ettringite stoichiometry for precipitation of 1350 ppm of sulfate as ettringite (200 ppm dissolved sulfate) with a 20% excess of calcium. A third one kilogram portion of the lime pretreated ARD solution was treated with 2.76 grams 32% sodium aluminate solution and 11.29 grams of 10% calcium hydroxide slurry to target ettringite stoichiometry for precipitation of 1550 ppm of sulfate as ettringite (0 ppm dissolved sulfate) with no excess aluminum or calcium.

Representative 3 mL portions of each reaction mixture were removed at 30 minutes, 60 minutes and 90 minutes of mixing. These portions were filtered using a 0.45 micron filter and analyzed to determine the concentration of soluble sulfate remaining in solution. The results are shown in Table 1. After 90 minutes of mixing each solution was filtered to yield a filtrate and an amount of solids. The mass of each material obtained is shown in Table 3 below. The non-ettringite stoichiometry of test 3 removed about the same sulfate as an ettringite stoichiometry (13% more aluminum and 20% less calcium than the non-ettringite test).

TABLE 3

|  | Test 1 | Test 2 | Test 3 |
|---|---|---|---|
| Target Precipitate Al/Ca/SO4 | 2/6/3 | 2/6/3 | 2/7.2/3 |
| Initial Sulfate | 1550 | 1550 | 1550 |
| Final Sulfate Target | 0 | 200 | 200 |
| 30 Minute Sulfate | 50 | 250 | 100 |
| 60 Minute Sulfate | 25 | 225 | 75 |
| 90 Minute Sulfate | 25 | 225 | 75 |
| Final Filtrate Mass (grams) | 949.2 | 955.2 | 957.1 |
| Final Wet Solids Mass (grams) | 62 | 53 | 55 |
| Percent Liquid Recovery | 94.92 | 95.52 | 95.71 |

Example 4: Aluminum+Ca(OH)$_2$ Treatment of Molybdate Solution

Figure 6A:
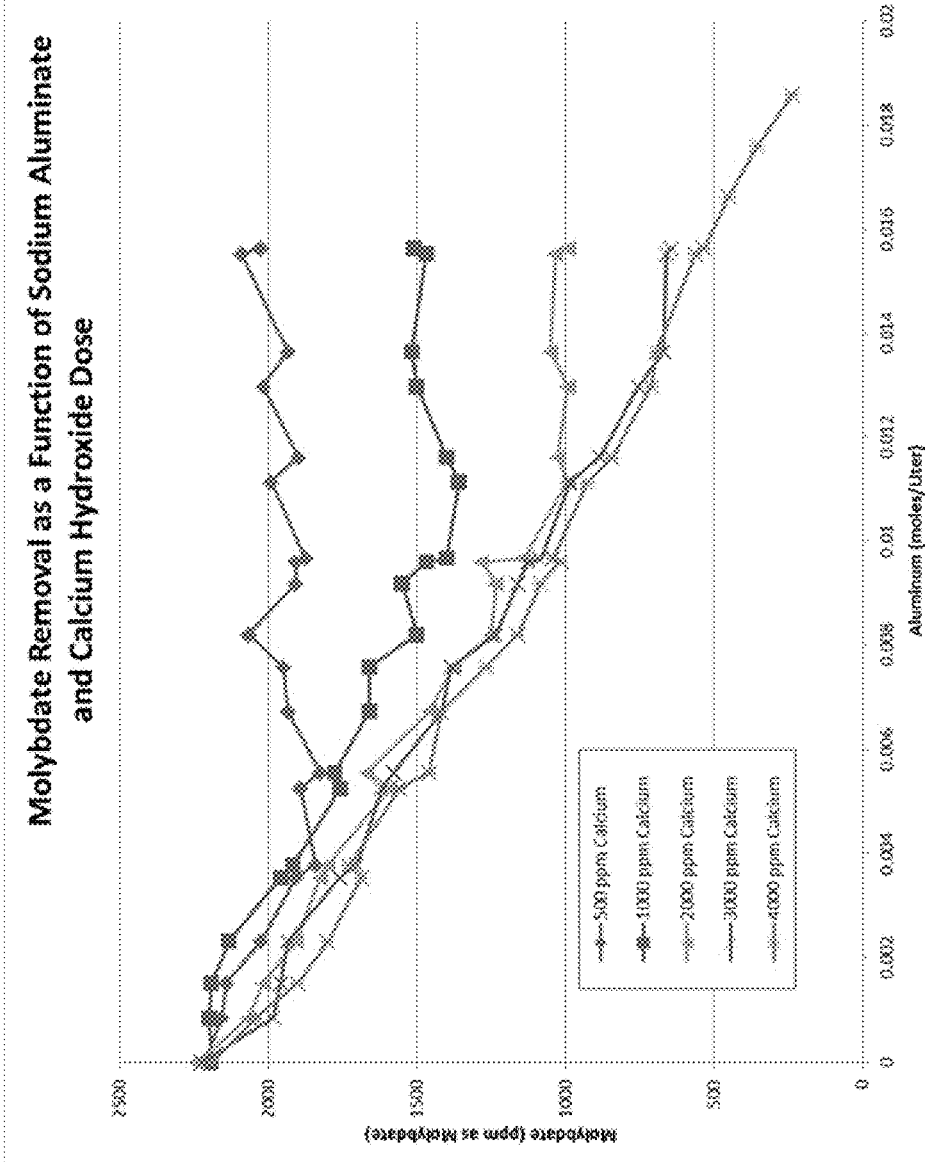
FIGS. 6A-6C are plots of example experimental data for molybdate oxoanion solutions treated with aluminum and calcium hydroxide.

A series of experiments were performed to demonstrate the capability of a combination of aluminum and calcium hydroxide or lime to remove molybdenum to a desired level. A 2200 ppm molybdate solution was prepared and sodium aluminate solution was added to portions of this solution to yield a range of aluminum concentrations from 0 to about 0.019 molar. After mixing the resulting solution for 5 minutes, a 10% calcium hydroxide slurry was then added to the solutions and the resulting slurry mixed for 60 minutes. The calcium hydroxide slurry was added to the solutions to yield a test range of 500 ppm to 4000 ppm calcium. In the case of one 2000 ppm calcium solution, portions of the slurry were removed at desired times, filtered using a 0.45 micron filter and analyzed to determine the sulfate concentration. The results of the 60 minute tests are shown in FIG. 6A.

Figure 6B:
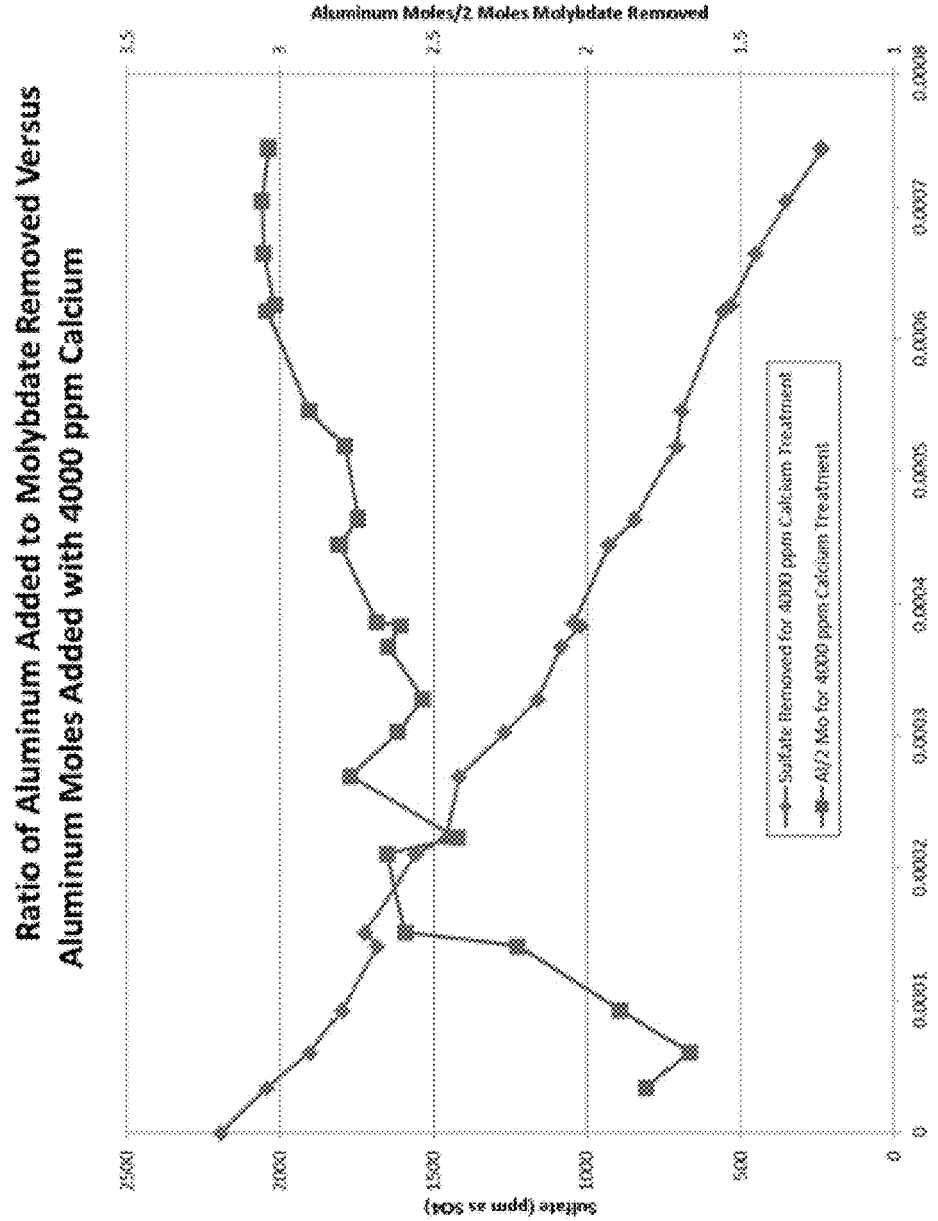
Figure 6C:
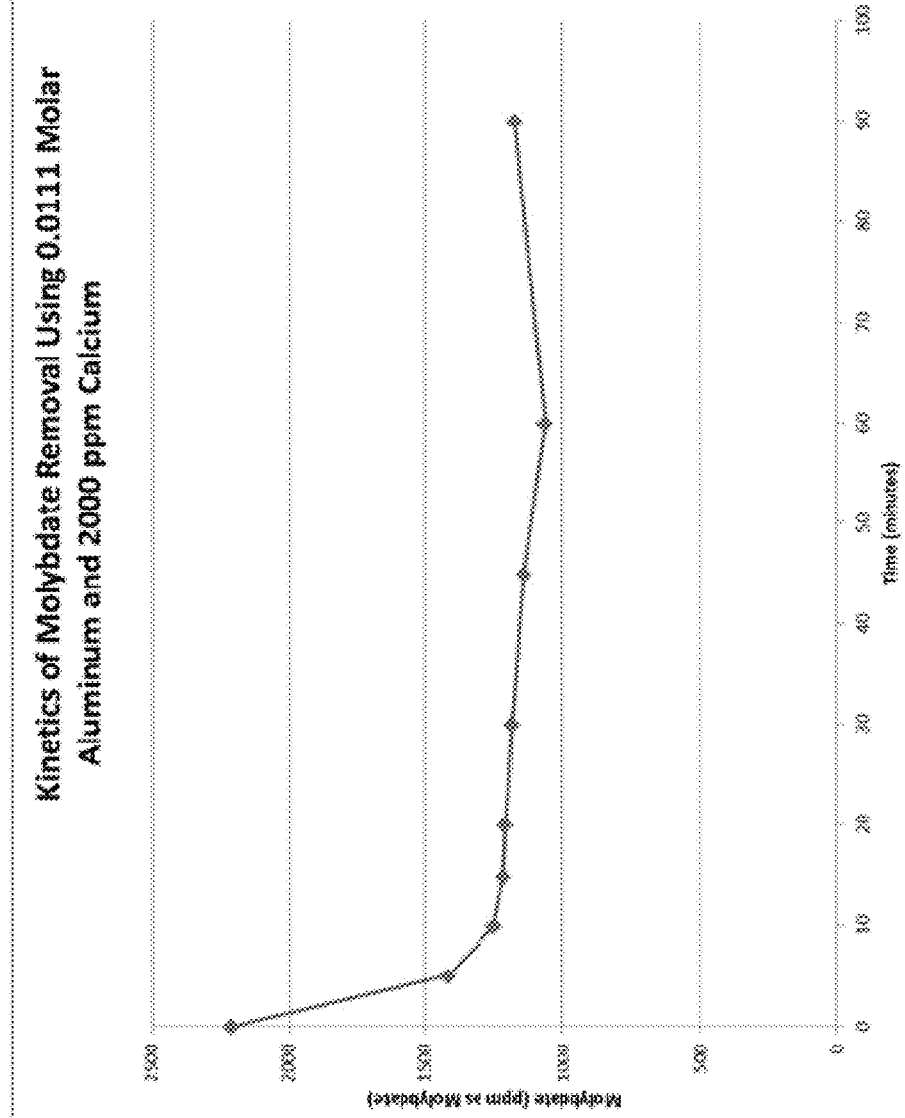

As shown in the figure, removal of molybdenum was influenced both by the concentration of aluminum and the concentration of calcium. As seen in FIG. 6B, the ratio of aluminum present to molybdate removed was a function of the aluminum dose and the ratio was about 3 mol aluminum to 2 mol molybdate as the molybdate concentration approached zero. At lower aluminum levels, the ratio of aluminum to molybdate removed was lower suggesting variable stoichiometry in the precipitate. As shown in FIG. 6C, the aluminum/calcium hydroxide based molybdate removal was rapid and complete within about 15 minutes.

Example 5: Aluminum+Ca(OH)$_2$ Treatment of Chromate Solution

Figure 7:
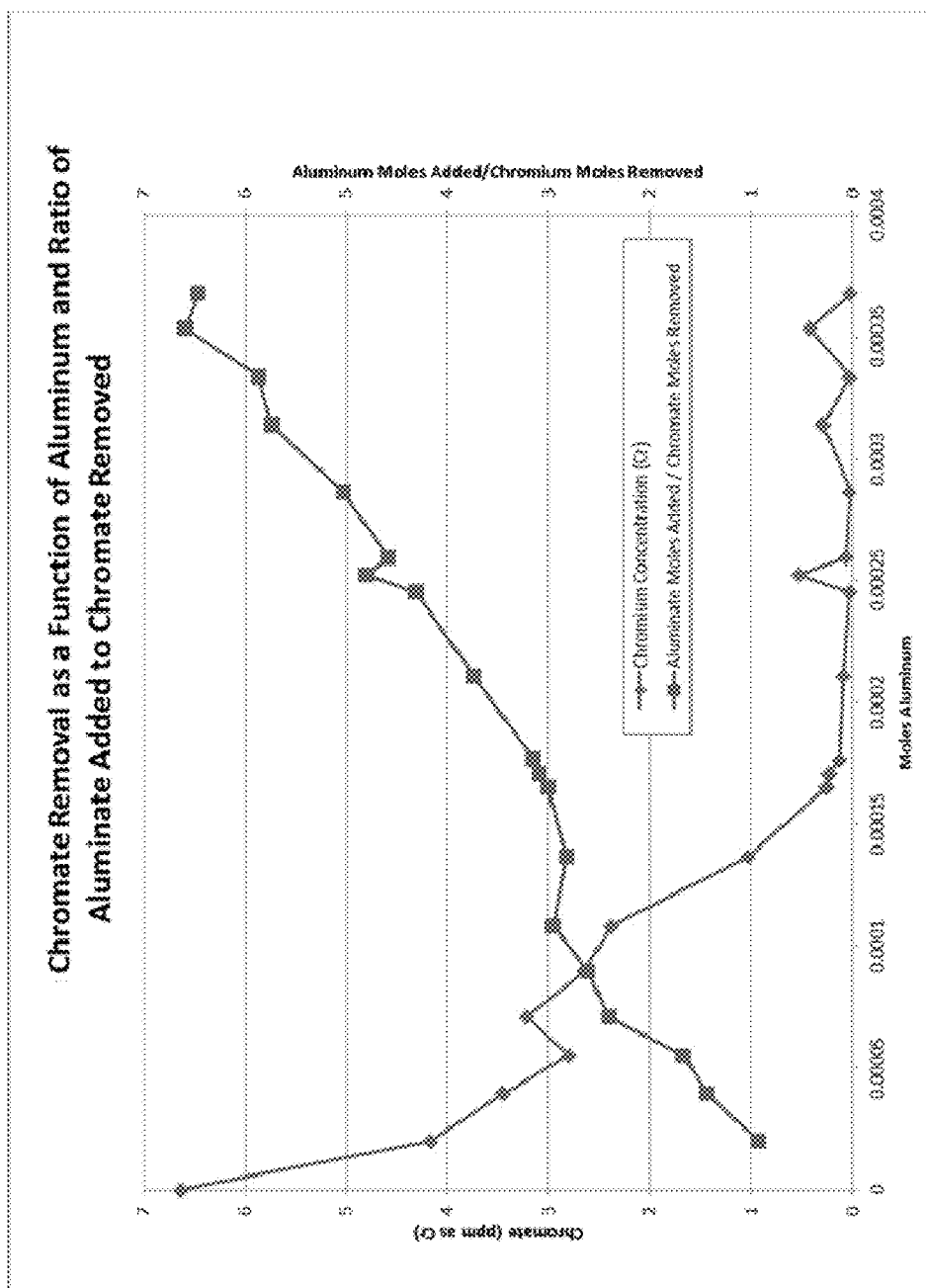
FIG. 7 is a plot of example experimental data for a chromate oxoanion solution treated with aluminum and calcium hydroxide.

A series of experiments were performed to demonstrate the capability of a combination of aluminum and calcium hydroxide or lime to remove chromium in the form of chromate to a desired level. In the chromium removal experiments varying amounts of a 32% sodium aluminate solution were added to portions of a 7 ppm chromate solution. After stirring for 5 minutes a 10% calcium hydroxide slurry was then added to yield a 500 ppm calcium in each portion. The range of aluminum concentrations tested was 0 to about 0.009 molar. The results are shown in FIG. 7.

As shown in the figure, removal of chromium was influenced by the concentration of aluminum. At a high enough aluminum and calcium dose, chromate removal was essentially complete. As seen in the figure, the ratio of aluminate added to chromate removed was a function of the aluminum dose and the ratio was about 3 when the chromate concentration reached zero. At lower aluminum levels the ratio was lower suggesting variable stoichiometry in the chromate containing precipitate.

Example 6: Aluminum+Ca(OH)$_2$ Treatment of Borate Solution

Figure 8:
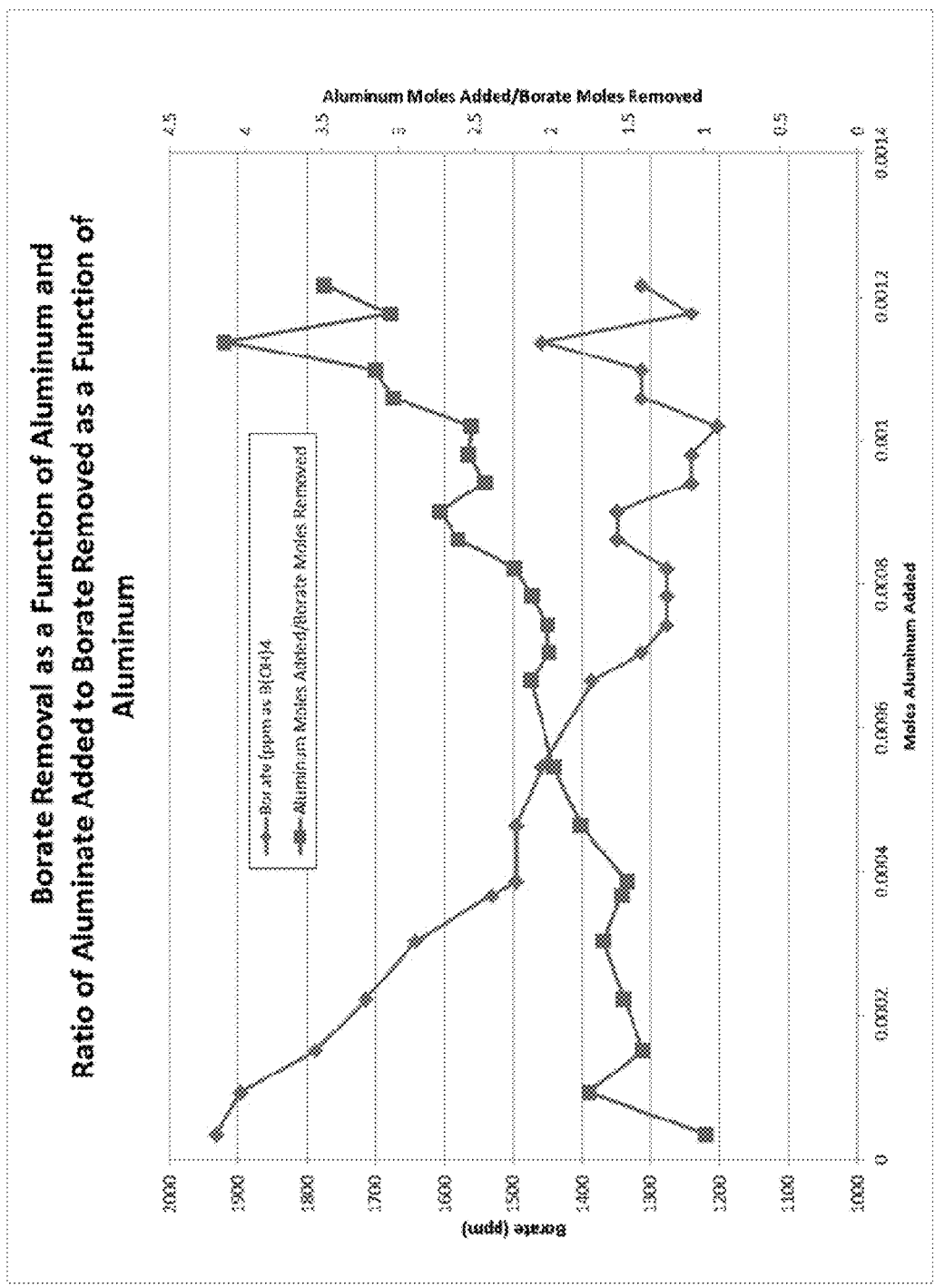
FIG. 8 is a plot of example experimental data for a borate oxoanion solution treated with aluminum and calcium hydroxide.

A series of experiments were performed to demonstrate the capability of a combination of aluminum and calcium hydroxide or lime to remove boron in the form of borate to a desired level. In the boron removal experiments varying amounts of a 32% sodium aluminate solution were added to a roughly 1330 ppm borate solution. After stirring for 5 minutes an amount of a 10% calcium hydroxide slurry was then added to yield 2100 ppm calcium in each portion. A range of aluminum concentrations from 0 to about 0.02 molar were investigated. The results are shown in FIG. 8.

As shown in the figure, removal of boron was influenced by the concentration of aluminum. As further seen in the figure, the ratio of aluminum added to borate removed was a function of the aluminum dose and the ratio was about 2 when the borate concentration reached a steady state. At lower aluminum levels, the ratio of aluminum added to borate removed was lower suggesting variable stoichiometry in the borate containing precipitate.

Example 7: Aluminum+Ca(OH)$_2$ Treatment of Nitrate Solution

Figure 9:
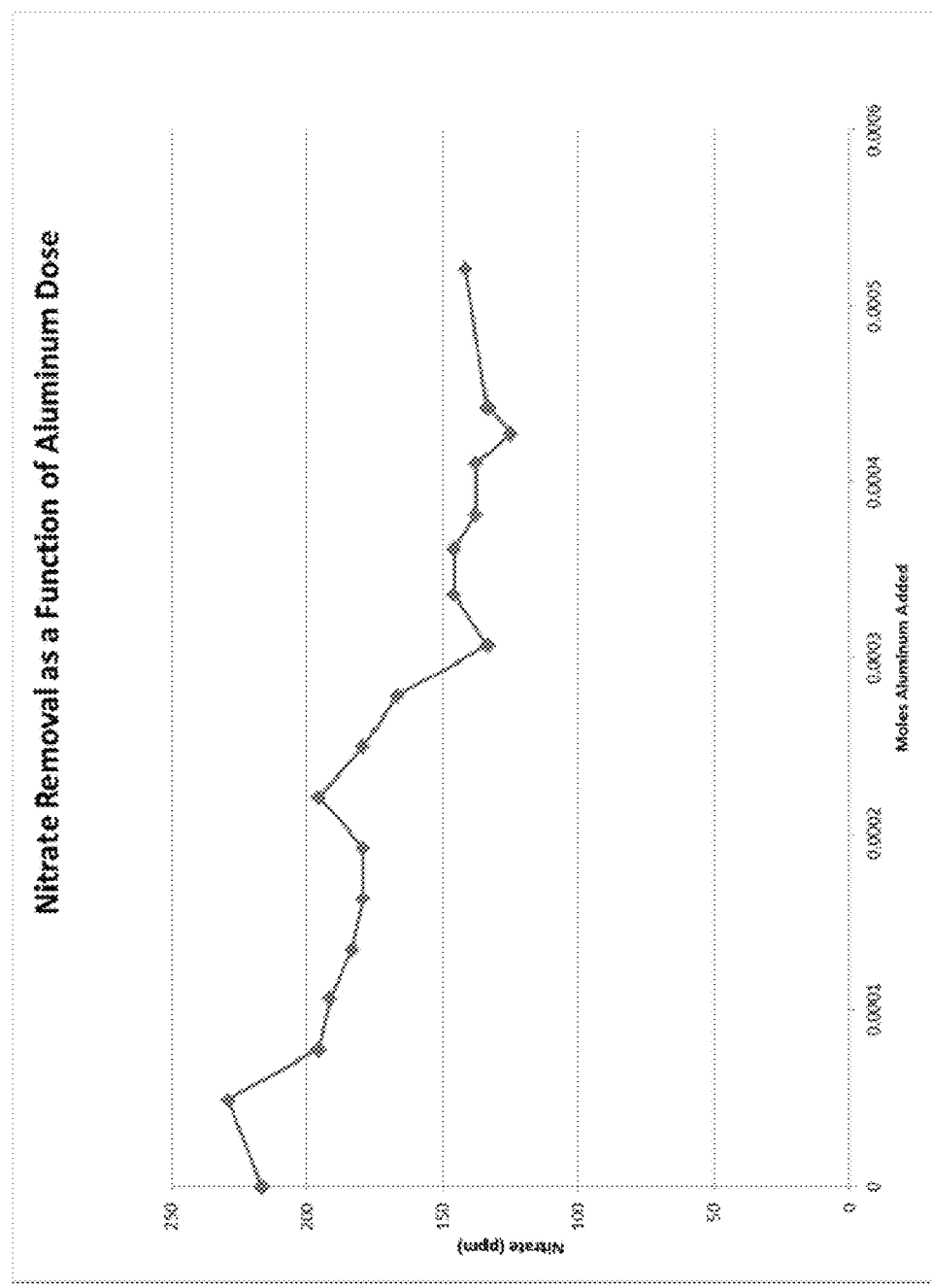
FIG. 9 is a plot of example experimental data for a nitrate oxoanion solution treated with aluminum and calcium hydroxide.

A series of experiments were performed to demonstrate the capability of a combination of aluminum and calcium hydroxide or lime to remove nitrate to a desired level. In the nitrate removal experiments varying amounts of a 32% sodium aluminate solution were added to a roughly 230 ppm nitrate solution. After stirring for 5 minutes an amount of a 10% calcium hydroxide slurry was then added to yield 863 ppm calcium in each portion. A range of aluminum concentrations from 0 to about 0.013 molar were investigated. The results are shown in FIG. 9.

As shown in the figure, removal of nitrate was influenced by the concentration of aluminum. The ratio of aluminum added to nitrate removed was a function of the aluminum dose and the ratio was about 7 when the nitrate concentration reached a steady state. At lower aluminum levels the ratio aluminum added to nitrate removed was lower suggesting variable stoichiometry in the nitrate containing precipitate.

The invention claimed is:

1. A method for reducing a concentration of one or more oxoanions in an aqueous stream comprising:
   receiving an aqueous stream having a metal cation and an oxoanion, wherein a concentration of the metal cation varies over time and a concentration of the oxoanion varies over time;
   continuously measuring the concentration of the metal cation so as to provide a current metal cation concentration in the aqueous stream;
   continuously measuring the concentration of the oxoanion in the aqueous stream so as to provide a current oxoanion concentration in the aqueous stream; and
   adding a metal cation source to the aqueous stream and an aluminum reagent to the aqueous stream,
   wherein an amount of the metal cation source added to the aqueous stream is determined based on the current metal cation concentration in the aqueous stream, an amount of the aluminum reagent added to the aqueous stream is based on the current oxoanion concentration in the aqueous stream, and the amount of the metal cation source and the amount of the aluminum reagent added to the aqueous stream is effective to reduce the concentration of the oxoanion in the aqueous stream below a target threshold.

2. The method of claim 1, further comprising, prior to continuously measuring the concentration of the metal cation and continuously measuring the concentration of the oxoanion, adding a basic alkaline earth metal reagent to the aqueous stream having the metal cation and the oxoanion, thereby precipitating a portion of the oxoanion out of the aqueous stream.

3. The method of claim 2, wherein adding the basic alkaline earth metal reagent to the aqueous stream comprises adding lime to the aqueous stream, and precipitating the portion of the oxoanion out of the aqueous stream comprises precipitating gypsum out of the aqueous stream.

4. The method of claim 1, wherein continuously measuring the concentration of the metal cation comprises continuously measuring the concentration of the metal cation via at least one of spectrophotometry, spectrofluorometry, and electrical conductivity.

5. The method of claim 1, wherein the metal cation comprises an alkaline earth metal.

6. The method of claim 5, wherein the metal cation is calcium.

7. The method of claim 1, wherein continuously measuring the concentration of the oxoanion comprises continuously measuring the concentration of the oxoanion via at least one of turbidity, spectroscopy, spectrophotometry, spectrofluorometry, electrical conductivity, and turbidity.

8. The method of claim 1, wherein the oxoanion comprises at least one of sulfate, molybdate, borate, chromate, selenite, selenate, arsenate, nitrate, and vandinate.

9. The method of claim 8, wherein the oxoanion comprises sulfate.

10. The method of claim 1, wherein continuously measuring the concentration of the metal cation and continuously measuring the concentration of the oxoanion comprises measuring the concentration of the metal cation and the concentration of the oxoanion at least once per hour.

11. The method of claim 1, wherein the aluminum reagent comprises at least one of sodium aluminate, calcium aluminate, aluminum chloride, polyaluminum chloride, aluminum hydroxide, aluminum acetate, and aluminum nitrate.

12. The method of claim 1, wherein the metal cation source comprises at least one of calcium hydroxide, calcium aluminate, calcium oxide, calcium chloride, magnesium hydroxide, dolomitic lime, fly ash, and clay.

13. The method of claim 1, further comprising adding a hydroxide source to the aqueous stream.

14. The method of claim 13, wherein the hydroxide source comprises at least one of calcium hydroxide, calcium oxide, magnesium hydroxide, sodium hydroxide, potassium hydroxide, ammonium hydroxide, dolomitic lime, fly ash, and clay.

15. The method of claim 1, the amount of the metal cation source added to the aqueous stream is effective to provide the concentration of the metal cation within the range from 2 moles metal cation per mol oxoanion targeted for removal to 20 moles metal cation per mole of oxoanion targeted for removal.

16. The method of claim 1, wherein the amount of aluminum reagent added to the aqueous stream is effective to provide an aluminum concentration ranging from 0.5 moles aluminum per mole of oxoanion targeted for removal to 8 moles aluminum per mole of oxoanion targeted for removal.

17. The method of claim 1, wherein the metal cation and the oxoanion comprise calcium sulfate, the metal cation source comprises calcium, the amount of the metal cation source added to the aqueous stream is effective to provide the concentration of the metal cation within the range from 2 moles calcium per mol sulfate targeted for removal to 3.1 moles calcium per mole of sulfate targeted for removal, and the amount of aluminum reagent added to the aqueous stream is effective to provide an aluminum concentration ranging from 0.5 moles aluminum per mole of sulfate targeted for removal to 1 mole aluminum per mole of sulfate targeted for removal.

18. The method of claim 1, wherein the amount of the metal cation source and the amount of the aluminum reagent added to the aqueous stream is effective to reduce the concentration of the oxoanion in the aqueous stream to within a range from 200 ppm oxoanion to 1000 ppm oxoanion.

19. The method of claim 1, wherein the metal cation source and the aluminum reagent are added to the aqueous stream at non-ettringite stoichiometry amounts.

20. The method of claim 1, wherein the amount of the metal cation source added to the aqueous stream and the amount of the aluminum reagent added to the aqueous stream are effective to form a precipitate having ettringite stoichiometry.

21. The method of claim 1, wherein the oxoanion concentration varies by at least 10 weight percent during the course of a day.

* * * * *